United States Patent

Akashi et al.

Patent Number: 5,620,781
Date of Patent: Apr. 15, 1997

[54] ERASABLE DISPLAY MEDIUM

[75] Inventors: Ryojiro Akashi; Akinori Inoue, both of Minami-ashigara, Japan

[73] Assignee: Fuji Xerox Co., Ltd., Tokyo, Japan

[21] Appl. No.: 457,309

[22] Filed: Jun. 1, 1995

Related U.S. Application Data

[63] Continuation of Ser. No. 197,460, Feb. 16, 1994, abandoned, which is a continuation of Ser. No. 961,637, Oct. 16, 1992, abandoned.

[30] Foreign Application Priority Data

Oct. 23, 1991 [JP] Japan ................................. 3-302704
May 1, 1992 [JP] Japan ................................. 4-137540

[51] Int. Cl.$^6$ .................................................. B32B 9/00
[52] U.S. Cl. ............. 428/195; 252/299.01; 252/299.65; 252/299.63; 349/198
[58] Field of Search ................................ 428/1, 195, 209; 252/299.01, 299.65, 299.63; 528/100, 308; 525/119; 359/82, 83, 100, 103

[56] References Cited

U.S. PATENT DOCUMENTS 4,362,771  12/1982  Umeda ............................................ 428/1
4,674,839   6/1987  Tsuboyama ................................... 359/82

(List continued on next page.)

FOREIGN PATENT DOCUMENTS 54-119377   9/1979  Japan.
55-154198  12/1980  Japan.

(List continued on next page.)

OTHER PUBLICATIONS

Makromol. Chem. 179, 2541–2544, (1978) Liquid Crystalline Polymers with Biphenyl-Moieties as Mesogenic Group.

(List continued on next page.)

Primary Examiner—Patrick Ryan
Assistant Examiner—Patrick Jewik
Attorney, Agent, or Firm—Oliff & Berridge

[57] ABSTRACT

An erasable display medium comprising a substrate having thereon at least one liquid crystal polymer layer comprising a side chain type liquid crystal polymer which repeatedly and reversibly switches from a transparent state and a light-scattered state by the action of at least one of heat, an electrical field, and a magnetic field is disclosed, said side chain type liquid crystal polymer being a copolymer comprising a repeating unit represented by formula (I):

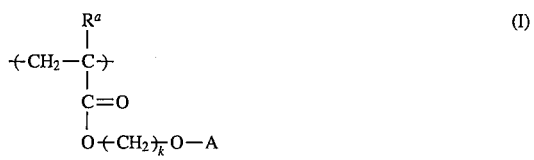

and a repeating unit represented by formula (II):

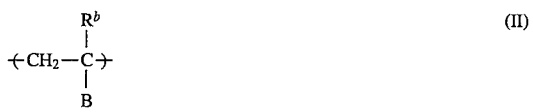

or a copolymer comprising a repeating unit represented by formula (III):

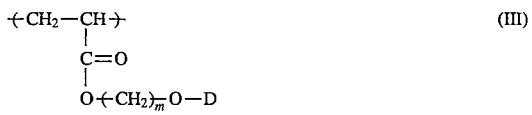

and a repeating unit represented by formula (IV):

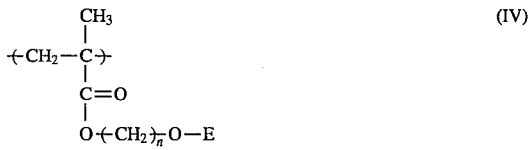

wherein $R^a$ and $R^b$ each represent a hydrogen atom, a methyl group, or a halogen atom; A, D, and E each represent a specific liquid crystal molecule residue; B represents a group composed of one or more of a hydroxyl group, a halogen atom, an alkyl group, an alkenyl group, a substituted or 1 TRANSPARENT SUBSTRATE
2 TRANSPARENT ELECTRODE
3 LIQUID CRYSTAL POLYMER LAYER
4 ELECTRODE (LIGHT-REFLECTING LAYER)
5 SUBSTRATE unsubstituted phenyl group, a heterocyclic group, an amino group, a cyano group, —COOR$^2$, —OCOR$^2$, and —CONR$^2$R$^3$, wherein R$^2$ and R$^3$ each represent a hydrogen atom, an alkyl group having from 1 to 30 carbon atoms which may be substituted with a halogen atom or a heterocyclic group, an alkenyl group, an alicyclic group, a hydroxyalkyl group, a hetero atom-containing alkyl group, or a substituted or unsubstituted phenyl group; and k, m, and n each represent an integer of from 1 to 30.

9 Claims, 2 Drawing Sheets

U.S. PATENT DOCUMENTS

| | | | |
|---|---|---|---|
| 4,702,945 | 10/1987 | Etzbach et al. | 428/1 |
| 4,944,896 | 7/1990 | De Martino | 359/103 |
| 4,952,334 | 8/1990 | Hakemi | 252/299.01 |
| 4,983,318 | 1/1991 | Matsumoto | 252/299.01 |
| 5,034,153 | 7/1991 | Uchida et al. | 428/1 |
| 5,087,672 | 2/1992 | Babirad | 428/1 |
| 5,207,952 | 5/1993 | Griffin, III | 252/299.01 |

FOREIGN PATENT DOCUMENTS

| | | |
|---|---|---|
| 60-180887 | 9/1985 | Japan . |
| 62-116192 | 5/1987 | Japan . |
| 64-20193 | 1/1989 | Japan . |
| 2-2520 | 1/1990 | Japan . |
| 2-42415 | 2/1990 | Japan . |
| 2-117888 | 5/1990 | Japan . |
| 3-53285 | 3/1991 | Japan . |

OTHER PUBLICATIONS

European Polymer Journal, vol. 18, pp. 651 to 659, 1982 Thermotropic Liquid–Crystalline Polymers—VI*.

Mol. Cryst. Liq. Cryst, 1989, vol. 169, pp. 167–192 Application of Side Chain Type Liquid Crystal Polymer for Display and Recording Devices.

Electronics Letters, 20 Feb. 1975, vol. 11, No. 4, pp. 73–74.

Appl. Phys. Lett., vol. 22, No. 3, 1 Feb. 1973, pp. 111–113.

Encyclopedia of Polymer Science & Engineering, vol. 9, Wiley & Sons, 1987 pp. 32–41, 54–55.

Meier et al "Applications of Liquid Crystals" Springer Verlag 1975, pp. 2–5, 110–111, 120–123.

ERASABLE DISPLAY MEDIUM

This is a continuation of application Ser. No. 08/197,460 filed Feb. 16, 1994, now abandoned, which in turn is a Continuation of U.S. application Ser. No. 07/961,637, filed Oct. 16, 1992, now abandoned.

The medium is usable as paper or an OHP sheet while being excellent in stability in repeated use, display contrast, preservation stability, and economy.

1. Field of the Invention

This invention relates to an erasable display medium. More particular, it relates to a display medium which serves as paper, heat-sensitive recording paper, a projector display sheet (e.g., over-head projector (hereinafter abbreviated as OHP) sheet), or a white board-like wide display medium and which can be repeatedly used for writing and erasing and is therefore advantageous for saving resources.

2. Background of the Invention

Paper has been used for a long time as a medium for display and recording of information. Notwithstanding the current trend of paperless information processing with the spread of flat panel displays, use of paper is still increasing, and far from decreasing. This appears to be because paper is a display medium of reflection type good for eyes and is excellent in flexibility and handiness.

As a method of displaying using other media, it is also popular to obtain a wide display by using a polyester OHP sheet on which a toner image is formed.

However, to use paper or plastics as a display medium in large quantity has given a rise to an issue from the standpoint saving of resources or environmental conservation. Under such a situation, various display media which may substitute for paper have been developed. For example, there has been proposed an erasable heat-sensitive display medium which comprises a high polymer matrix having dispersed therein an organic low-molecular weight compound and is capable of controlling light scattering and transmission through control of the heat applied as disclosed in JP-A-54-119377 and JP-A-55-154198 (the term "JP-A" as used herein means an "unexamined published Japanese patent application"); a phase separation type display medium comprising a film of a polymer blend which makes a display through heat-controlled phase separation as disclosed in JP-A-60-180887 and JP-A-62-116192; and an erasable display medium using a liquid crystal polymer which makes a display through a similar mechanism as disclosed in JP-A-2-117888 and JP-A-3-53285.

Further, attention has been paid, because of a high resolving power achieved, to a projector display device of heat address type which comprises a smectic liquid crystal sandwiched in between a pair of transparent electrodes and is capable of repetition of image formation and erasing by the action of an electrical field and heat (see *Electronics Letters*, Vol. 11, No. 4, p. 73 (1975) and *Appl. Phys. Lett.*, Vol. 22, No. 3, p. 111 (1973)).

The erasable heat-sensitive display medium comprising a high polymer matrix film containing an organic low-molecular weight compound or the erasable heat-sensitive display medium comprising a polymer blend film reversibly achieves a light-transmitted state (transparent state) and a light-scattered state (opaque state) by controlling the compatibility of the binary system by means of heat. However, the two components of the binary dispersed or mixed system deteriorate with repeated use, and the contrast between the two states becomes smaller, resulting in a reduction in display contrast. Thus, the number of times of repeated use is so limited.

The known erasable display media using liquid crystal polymers have low display contrast and insufficient record preservability.

The currently available OHP sheets are practically used only once and therefore unfavorable from the considerations of saving resources, economy, and environmental conservation.

The heat address type projector display device using a smectic liquid crystal lacks flexibility because of use of glass as an electrode substrate and the demand for precision of the cell gap. Further, projectors using a strong light source are accompanied with display instability against the heat generated. In addition, the system is expensive.

SUMMARY OF THE INVENTION

An object of the present invention is to provide an erasable display medium which can be used just like paper or an OHP sheet and which is free from the disadvantages associated with the conventional techniques, such as poor durability on repeated use, low display contrast, and poor record preservability.

Another object of the present invention is to provide a display sheet for a projector which can be repeatedly used and has excellent heat stability and high display contrast and is still inexpensive.

The present invention relates to an erasable display medium comprising a substrate having thereon at least one liquid crystal polymer layer comprising a side chain type liquid crystal polymer which repeatedly and reversibly switches from a transparent state and a light-scattered state by the action of at least one of heat, an electrical field, and a magnetic field, said side chain type liquid crystal polymer being a copolymer comprising a repeating unit represented by formula (I):

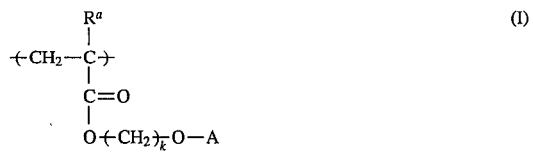

and a repeating unit represented by formula (II):

or a copolymer comprising a repeating unit represented by formula (III):

and a repeating unit represented by formula (IV):

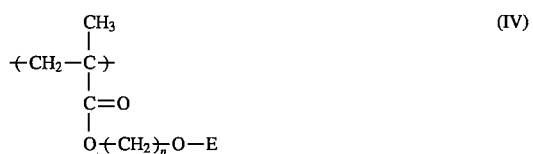

wherein $R^a$ and $R^b$ each represent a hydrogen atom, a methyl group, or a halogen atom; A, D, and E each represent a liquid crystal molecule residue composed of one or more groups selected from:

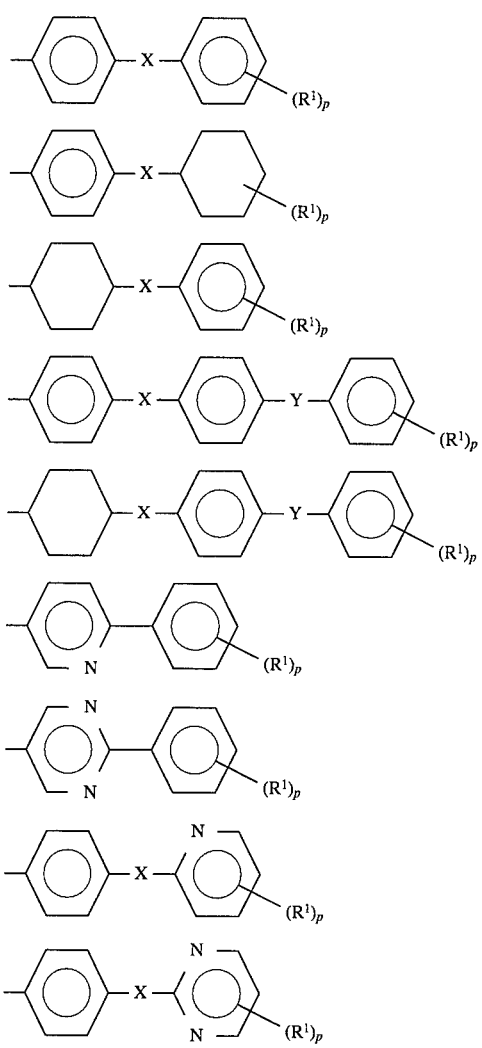

wherein X and Y each represent a single bond, —N=N—, —N(→O)=N—, —CH=N—, —N=CH—, —COO—, —O(C=O)—, or an ethynylene group; $R^1$ represents an alkoxy group having from 1 to 30 carbon atoms, a halogen atom, a cyano group, a carboxyl group, or an alkyl group having from 1 to 30 carbon atoms; and p represents an integer of from 1 to 5; when p is 2 or greater, the plural $R^1$ groups may be the same or different;

B represents a group composed of one or more of a hydroxyl group, a halogen atom, an alkyl group having from 1 to 30 carbon atoms, an alkenyl group having from 1 to 30 carbon atoms, a substituted or unsubstituted phenyl group, a heterocyclic group, an amino group, a cyano group, —COOR$^2$, —OCOR$^2$, and —CONR$^2$R$^3$, wherein $R^2$ and $R^3$ each represent a hydrogen atom, an alkyl group having from 1 to 30 carbon atoms which may be substituted with a halogen atom or a heterocyclic group, an alkenyl group having from 1 to 30 carbon atoms, an alicyclic group, a hydroxyalkyl group having 1 to 10 carbon atoms, a hetero atom-containing alkyl group having 1 to 30 carbon atoms, or a substituted or unsubstituted phenyl group; and k, m, and n each represent an integer of from 1 to 30.

Of the erasable display media according to the present invention, those comprising a transparent substrate are useful as an erasable display sheet for a projector. In this embodiment, the side chain type liquid crystal polymer is preferably a copolymer comprising the repeating units represented by formulae (III) and (IV).

DETAILED DESCRIPTION OF THE INVENTION

Figure 1:
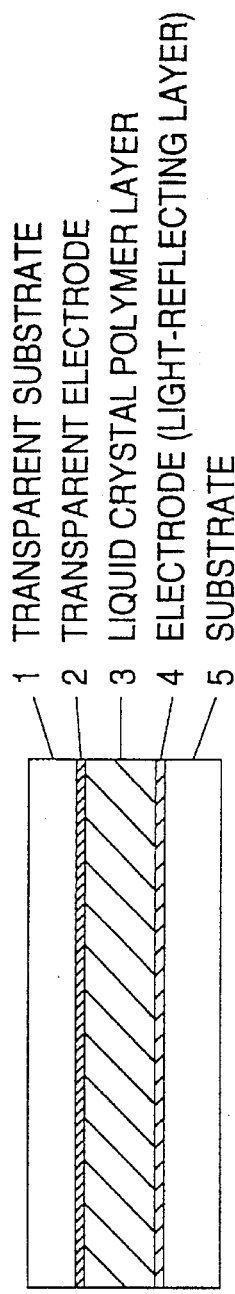
FIGS. 1 through 6 each illustrate a cross section of the erasable display medium according to the present invention in various embodiments.

The side chain type liquid crystal polymer which can be used in the present invention includes (A) a copolymer essentially comprising a unit derived from a liquid crystal monomer containing an acrylic polymerizable group and a unit derived from a specific non-liquid crystal monomer (hereinafter referred to as copolymer (A)) and (B) a copolymer essentially comprising a unit derived from a liquid crystal monomer containing an acrylic ester polymerizable group and a unit derived from a liquid crystal monomer containing a methacrylic ester polymerizable group (hereinafter referred to as copolymer (B)). Such a copolymer construction makes it possible to enjoy excellent characteristics suitable for use as projector display materials or any other erasable display media, that is, heat stability of a display, high display contrast, durability on repeated use, and stability of the record which could not be achieved with an acrylic liquid crystal homopolymer or a methacrylic liquid crystal homopolymer.

In the repeating units for the copolymers (A) and (B), $R^a$ and $R^b$ each preferably are a hydrogen atom or a methyl group, B is preferably —COOR$^2$, and k, m, and n each preferably are an integer of from 2 to 20.

Copolymers (A) and (B) can be prepared by usual radical polymerization or ionic polymerization of a monomer mixture at a prescribed mixing ratio, followed by purification, for example, with a poor solvent, e.g., alcohols or ethers.

Liquid crystal monomers which can be used for the preparation of the side chain type liquid crystal polymers are described in *Makromol. Chem.*, Vol. 179, p. 273 (1978), *Eur. Polym. J.*, Vol. 18, p. 651 (1982), and *Mol. Cryst. Liq. Cryst.*, Vol. 169, p. 167 (1989). Among them, for example, are various compounds composed of a rigid molecule, such as a biphenyl skeleton, a phenyl benzoate skeleton, a cyclohexylbenzene skeleton, an azoxybenzene skeleton, an azobenzene skeleton, an azomethine skeleton, a phenylpyrimidine skeleton, a diphenylacetylene skeleton, a biphenyl benzoate skeleton, a cyclohexylbiphenyl skeleton, or a terphenyl skeleton, to which an acrylic ester or a methacrylic ester is bonded via an alkyl spacer having a prescribed length.

Such liquid crystal monomers can be represented by formula:

wherein $R^a$, A, and k are as defined above.

As the non-liquid crystal monomers, general-purpose monomers of various kinds are employable. Specific examples are $C_{1-30}$ alkyl esters of (meth)acrylic acid or derivatives thereof, dialkylaminoethyl (meth)acrylate, polyethylene glycol mono(meth)acrylate, (meth)acrylic acid, (meth)acrylamide, styrene, styrene derivatives, (meth)acrylonitrile, vinyl chloride, vinylidene chloride, and N-vinylpyrrolidone.

While the copolymerization ratio of the two monomers in copolymer (A) is subject to variation depending on the desired characteristics, the liquid crystal monomer content preferably ranges from 50 to 99% by weight, and more preferably from 80 to 98% by weight.

In choosing two liquid crystal monomers for the preparation of copolymer (B), the two monomers may have the same structure except for the difference between an acrylate polymerizable group and a methacrylate polymerizable group, or they may have entirely different structures. Further, two or more acrylate monomers or two or more methacrylate monomers may be used in combination.

While the copolymerization ratio of the two monomers in copolymer (B) is subject to variation depending on the desired contrast or heat stability, the content of the liquid crystal monomer having a methacrylate group preferably ranges from 5 to 95% by weight, and more preferably from 10 to 80% by weight.

Copolymer (A) or (B) is not particularly limited by its copolymerization form and may have various forms, such as a random copolymer, a grafted copolymer, an alternating copolymer, etc.

Copolymer (A) or (B) preferably has a weight-average molecular weight of from 1000 to 500,000. From the standpoint of film-forming properties, film strength, and switching time, a range of from 10,000 to 100,000 is preferred. If the weight-average molecular weight is less than 1000, the film-forming properties or shape retention would be reduced. If it exceeds 500,000, the switching properties in an electrical field or orientation properties would be reduced.

Of copolymers (A) and (B), copolymer (B) exhibits excellent heat stability of the record and high contrast and is particularly useful as a projector display medium, such as an OHP sheet.

Specific examples of the copolymers (A) and (B) of the present invention are shown below but the present invention is not limited thereto.

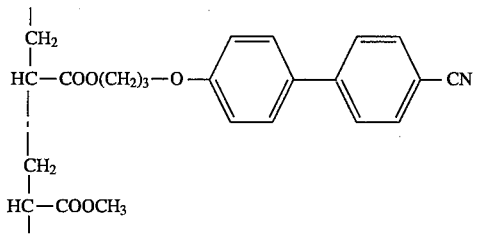

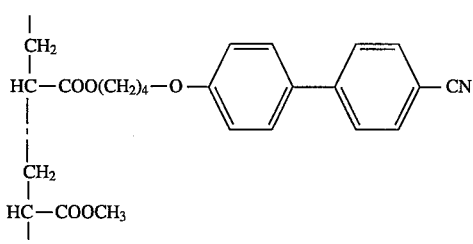

-continued

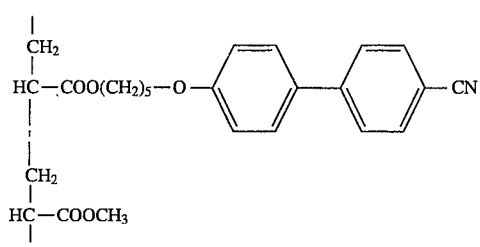

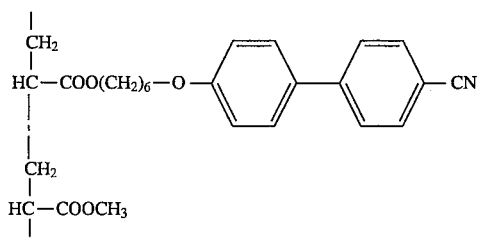

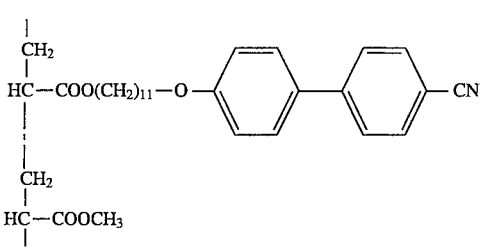

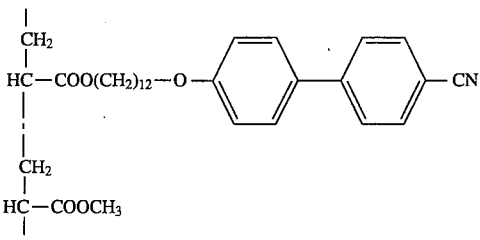

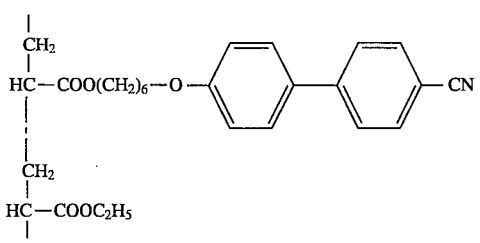

7
-continued
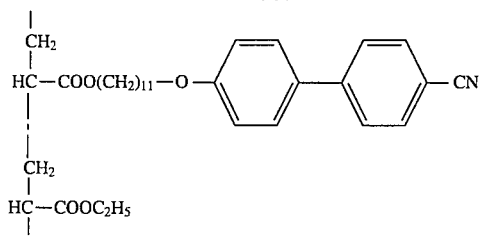
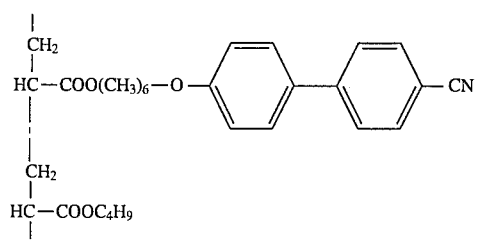
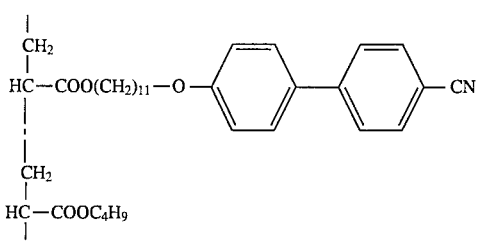
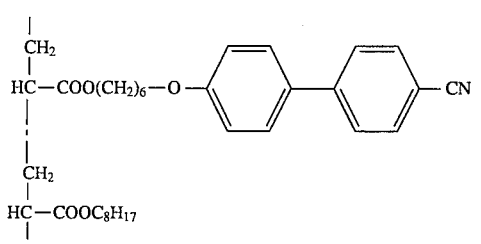
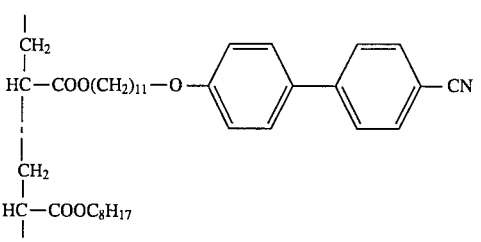
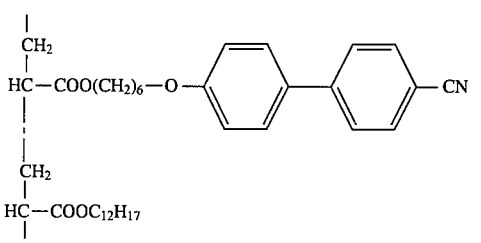
8
-continued
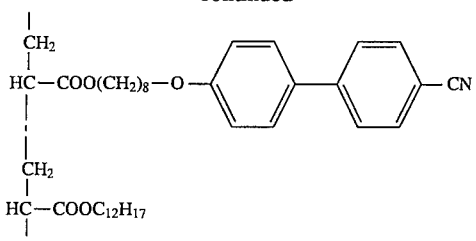
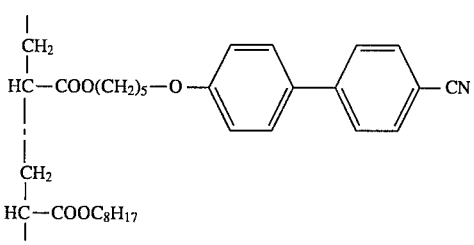
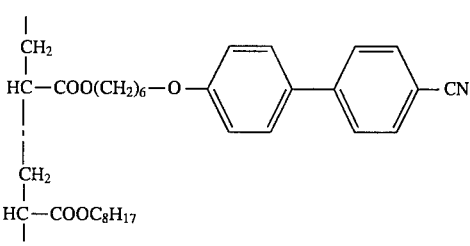
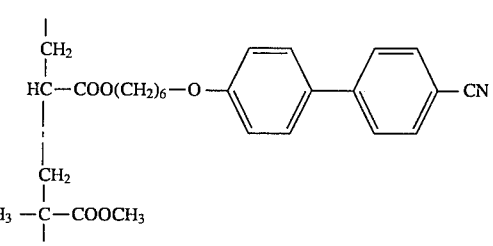
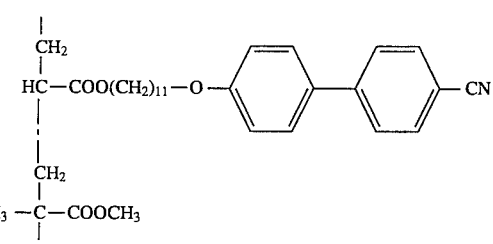
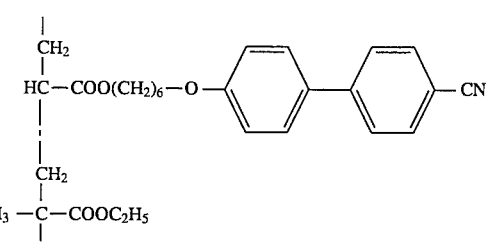

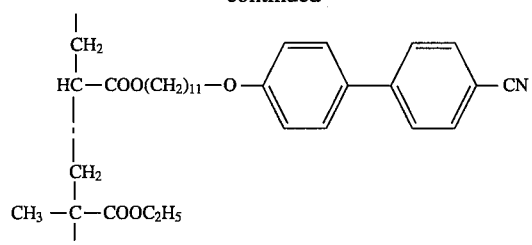
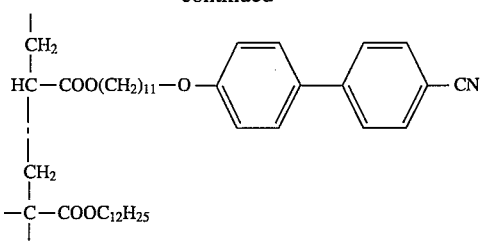
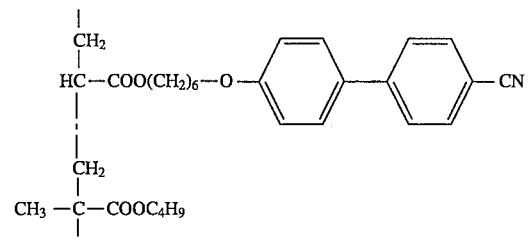
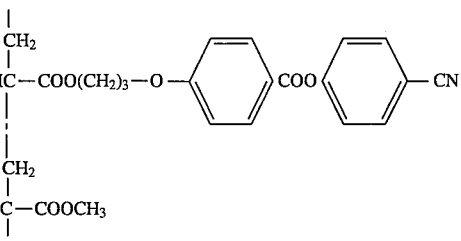
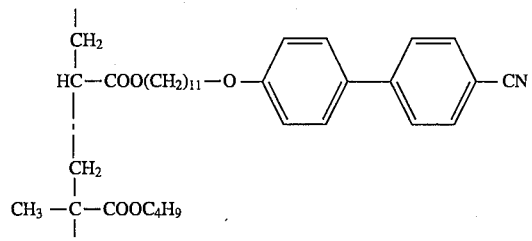
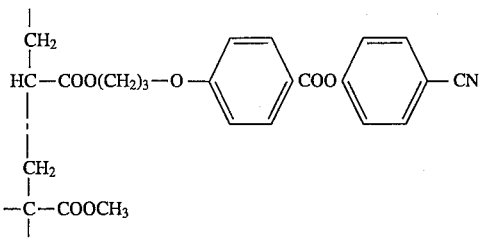
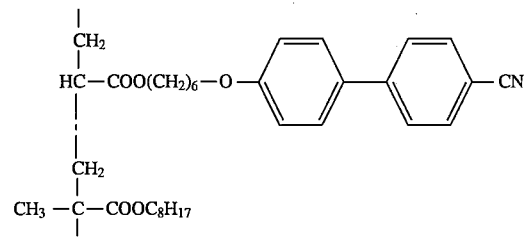
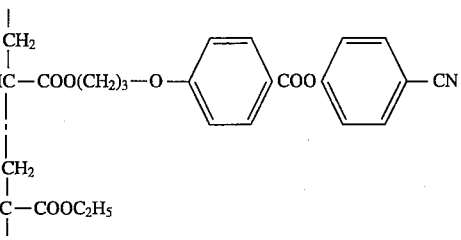
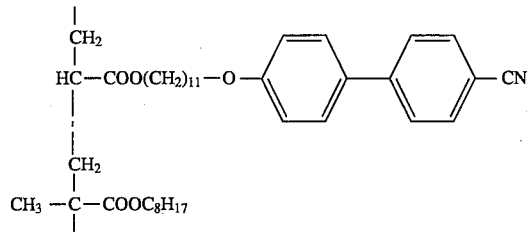
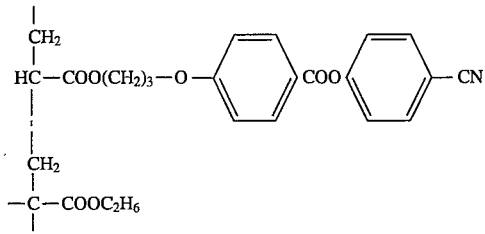
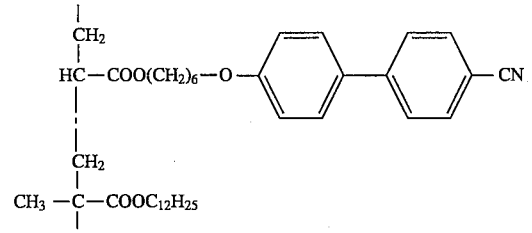
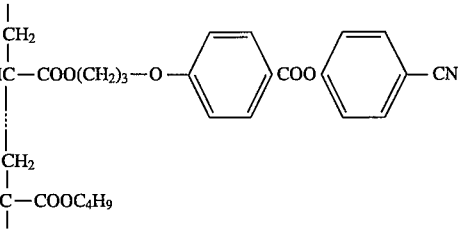

11
-continued
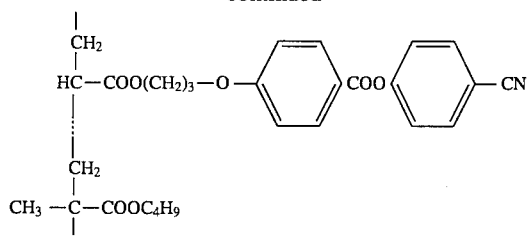
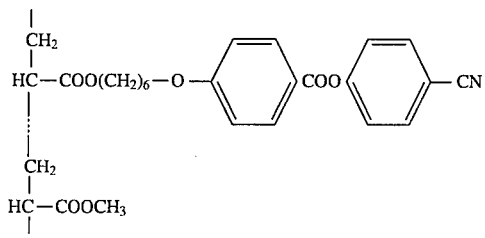
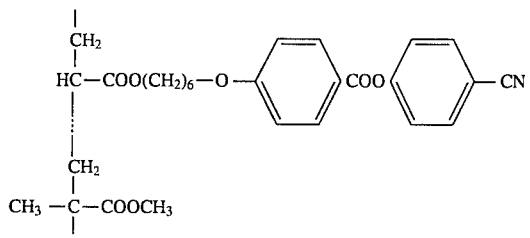
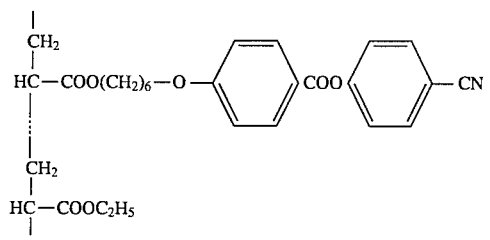
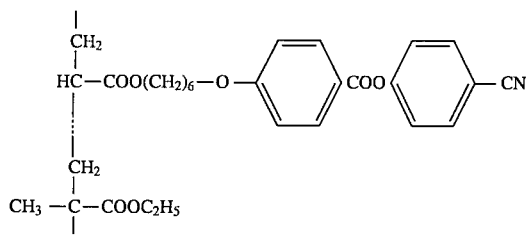
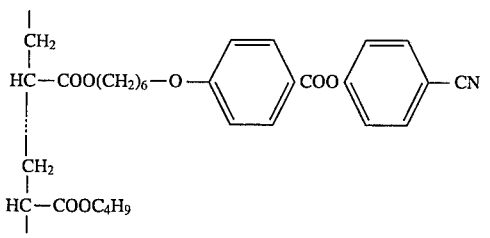
12
-continued
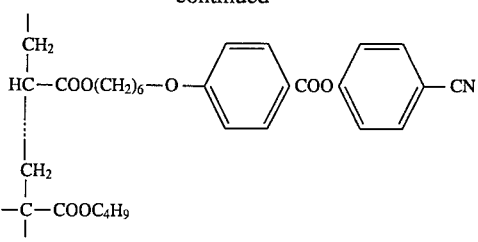
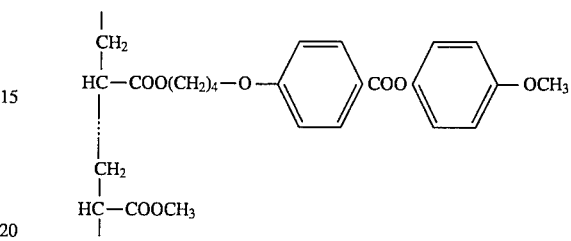
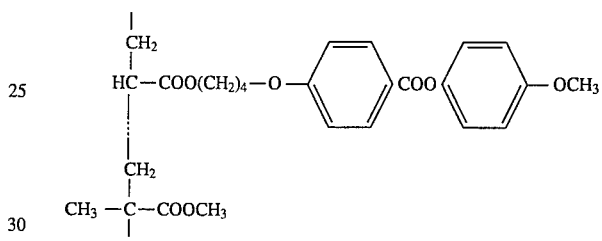
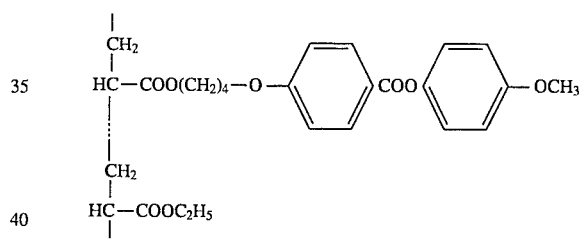
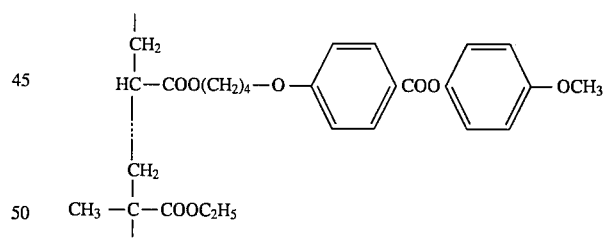
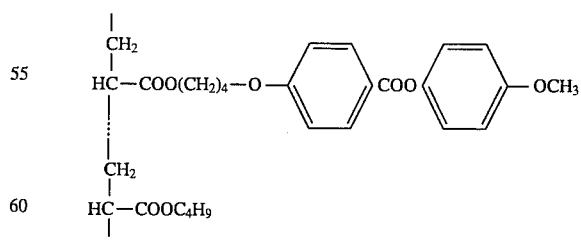

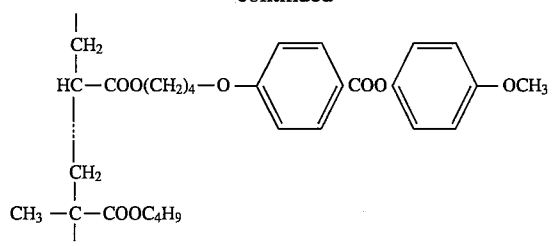
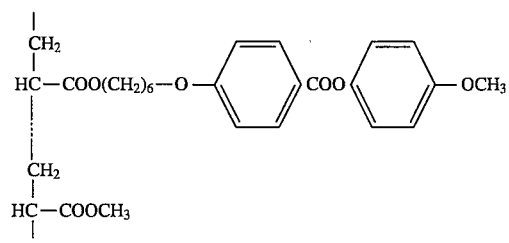
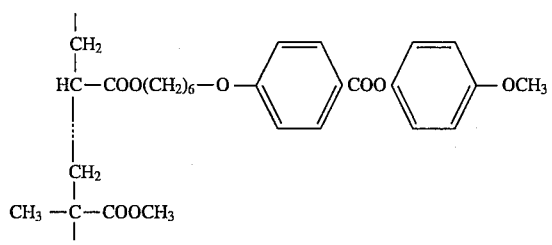
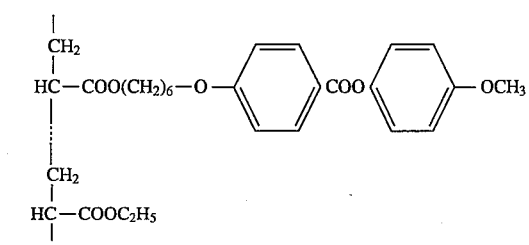
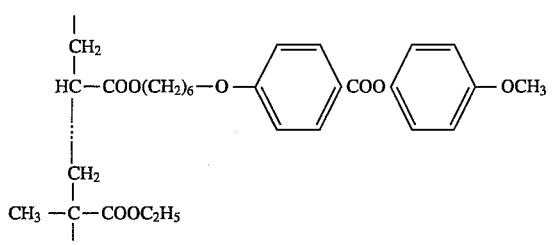
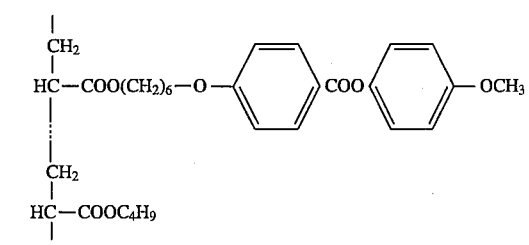
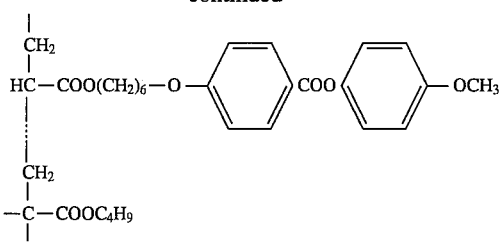
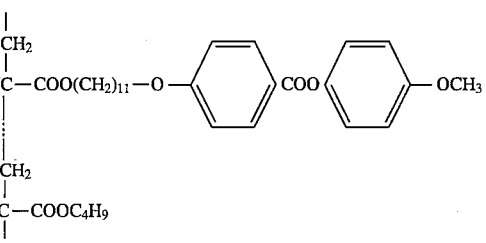
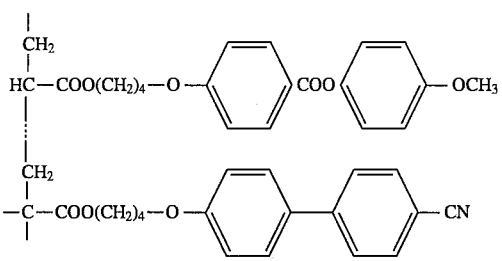
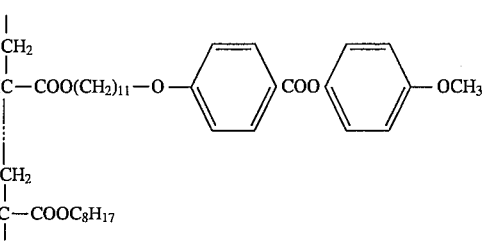
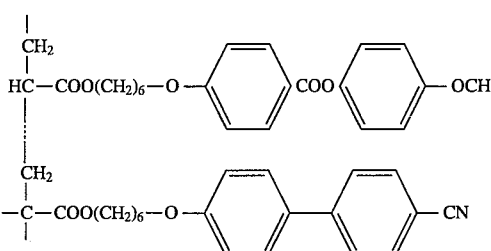
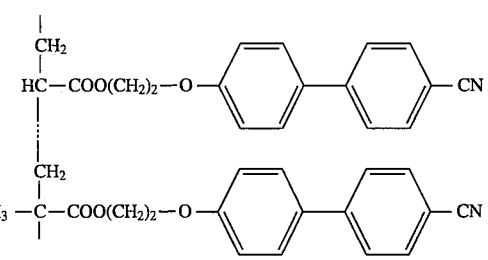

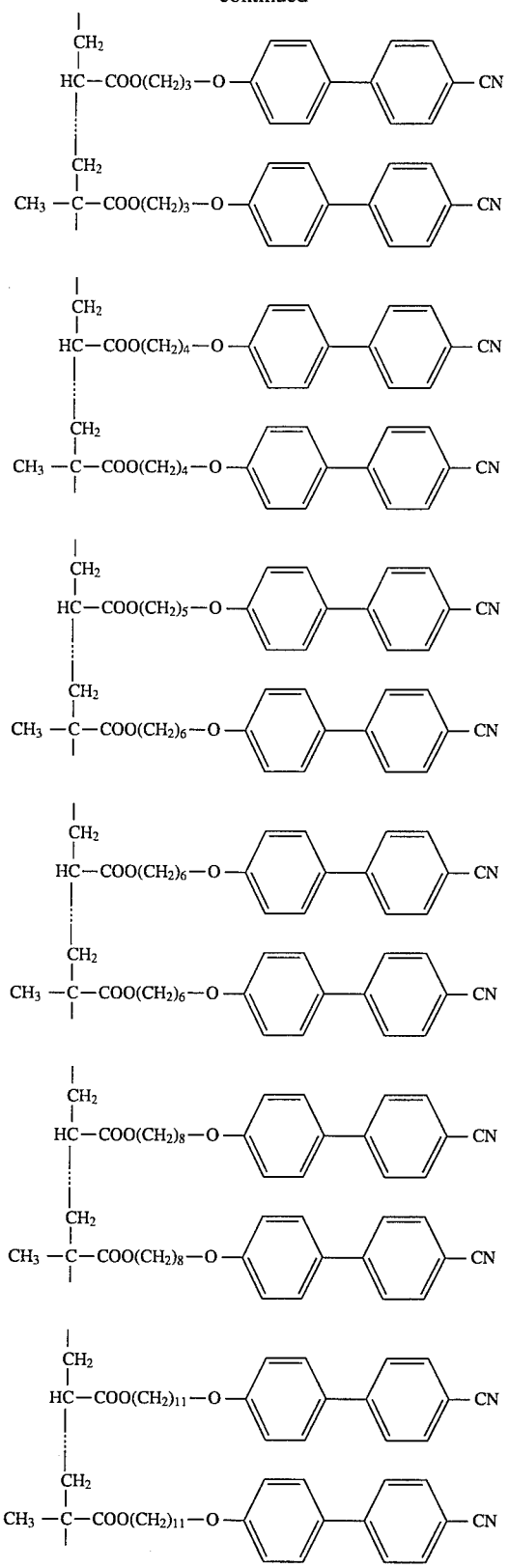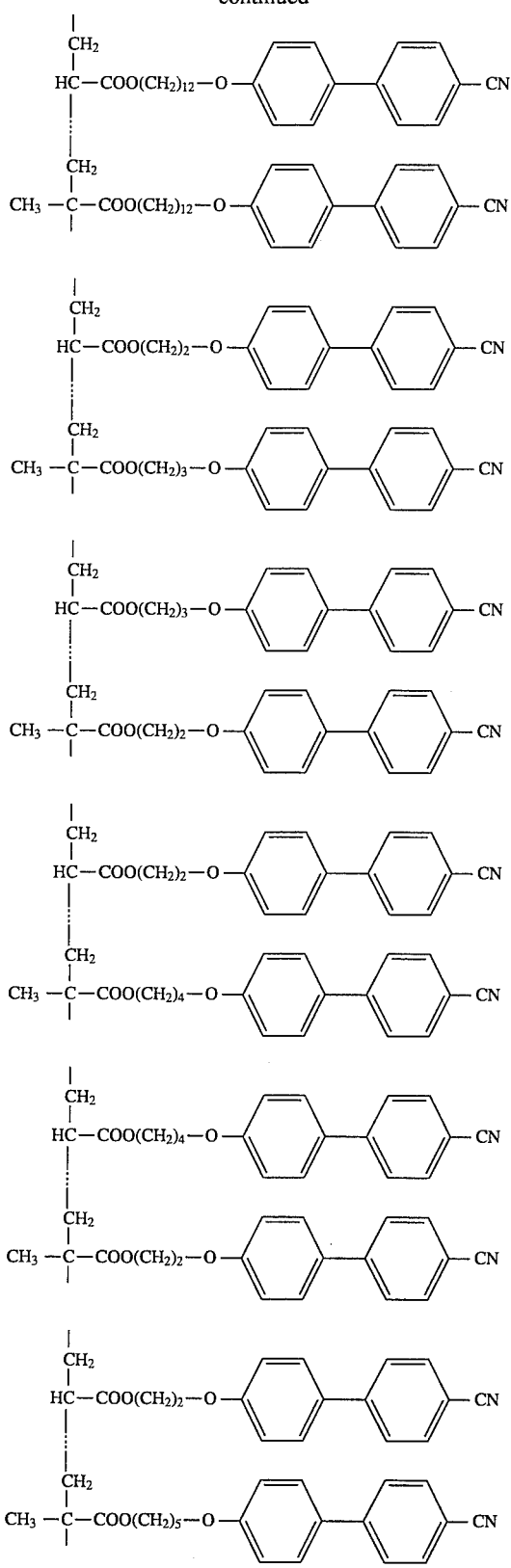

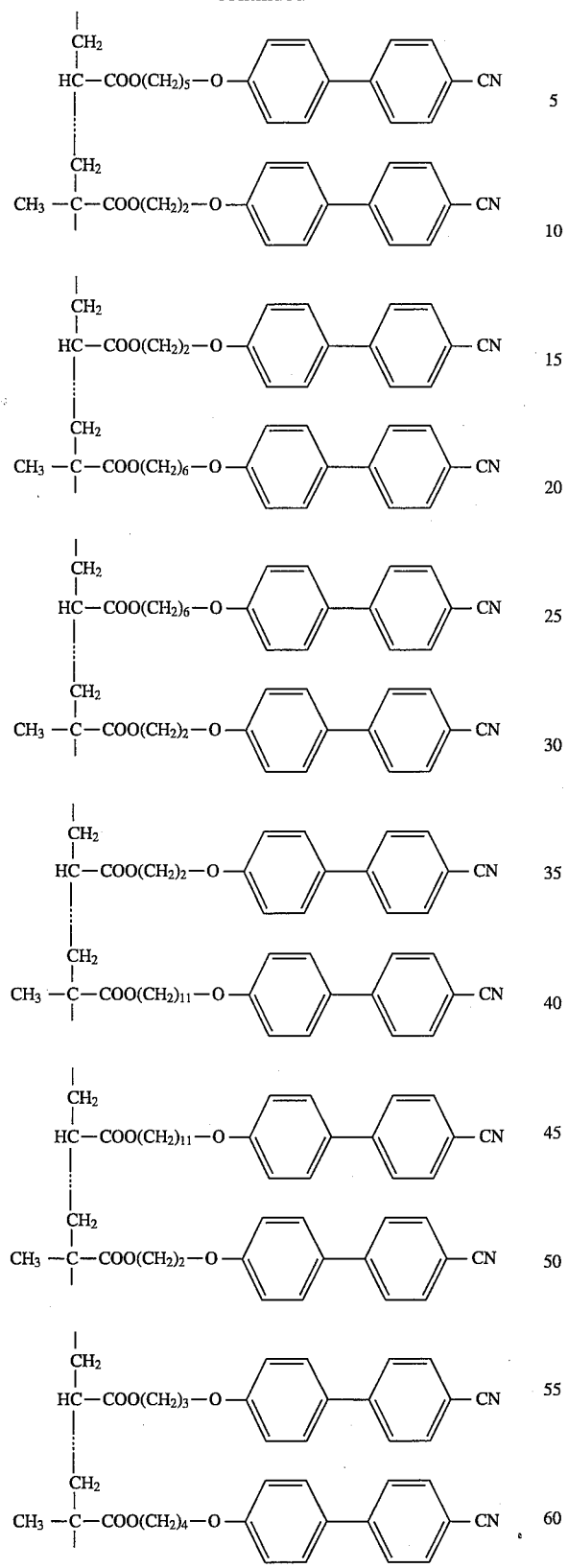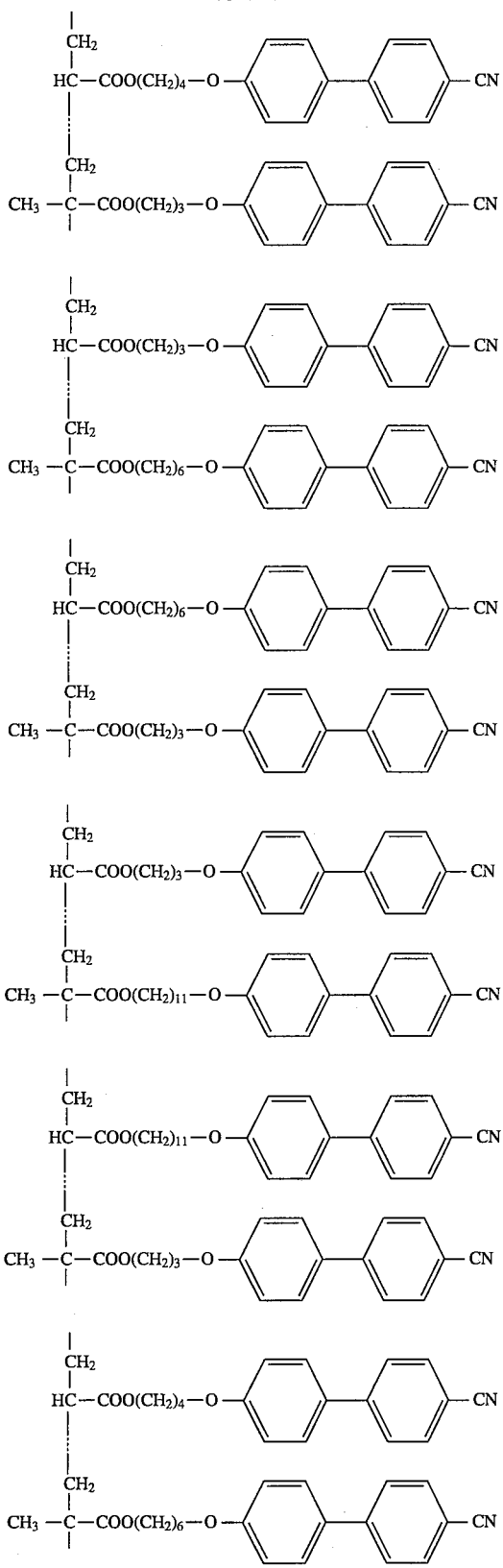

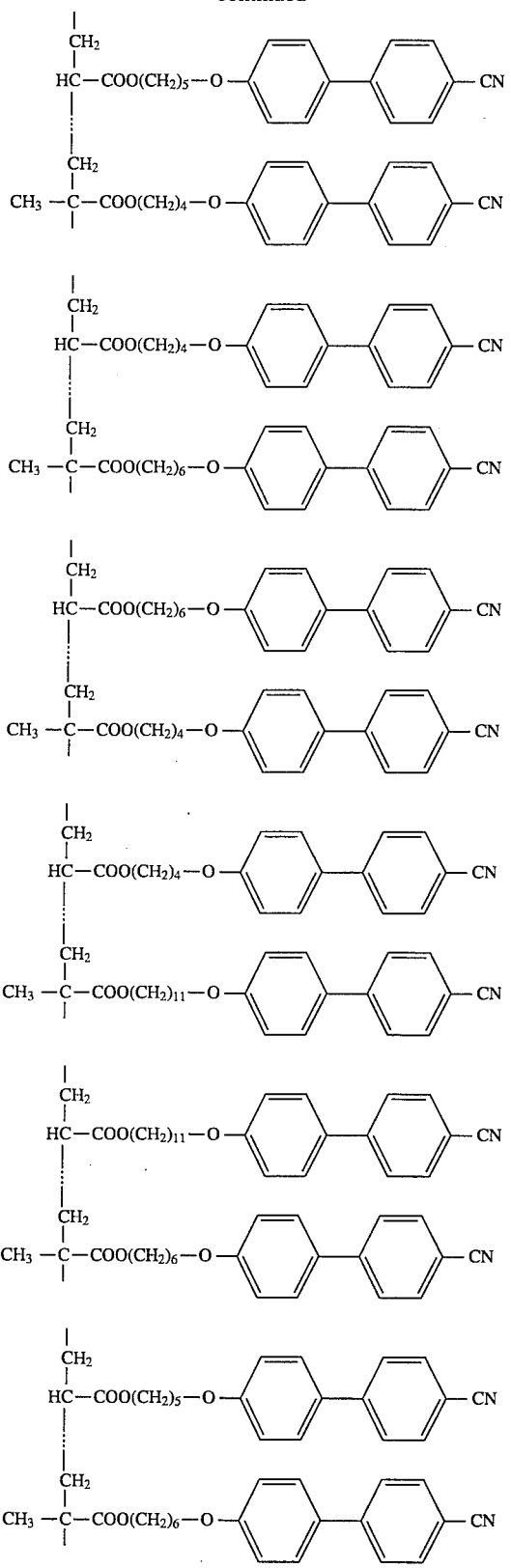
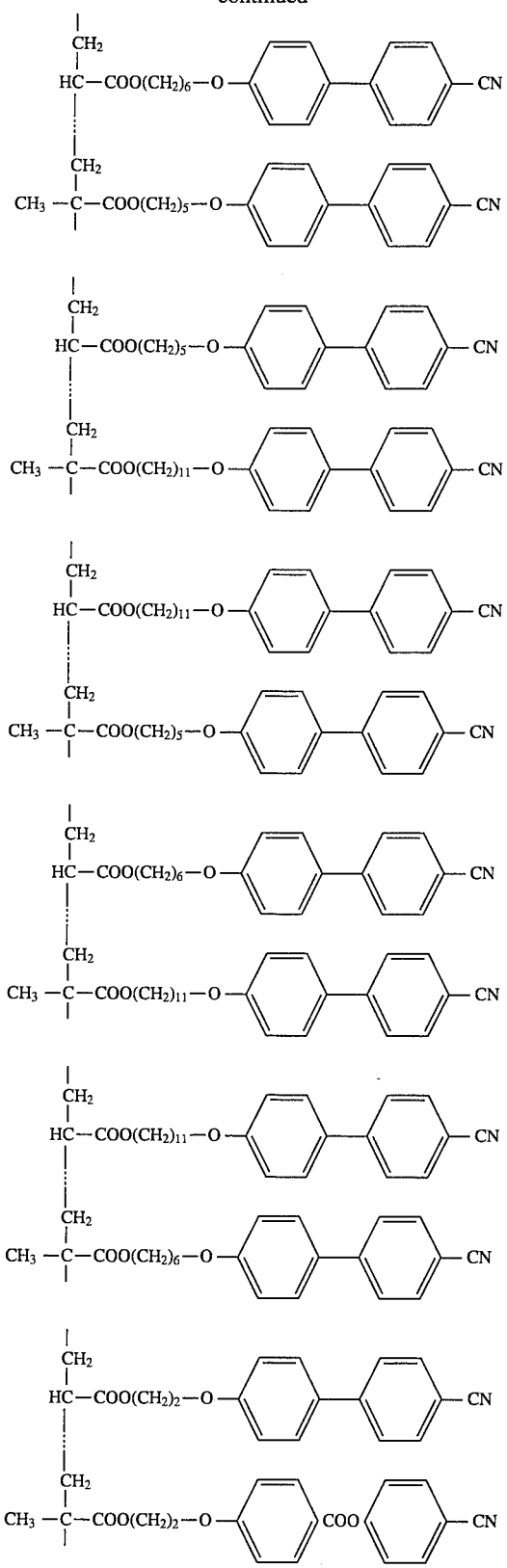

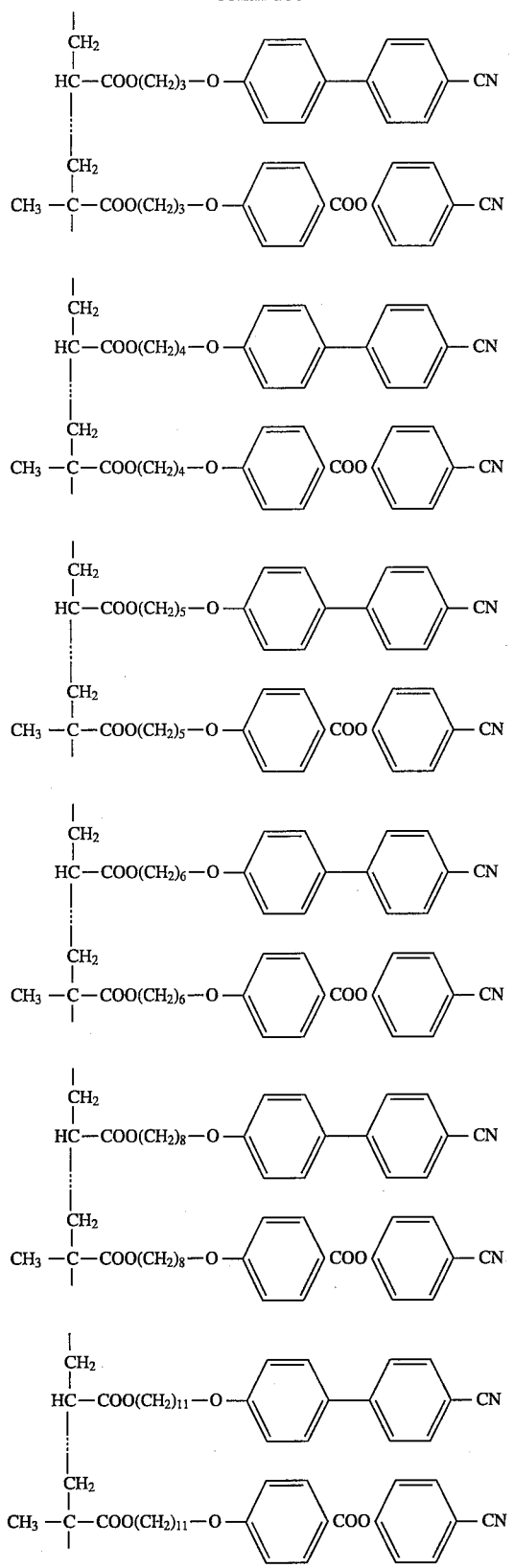
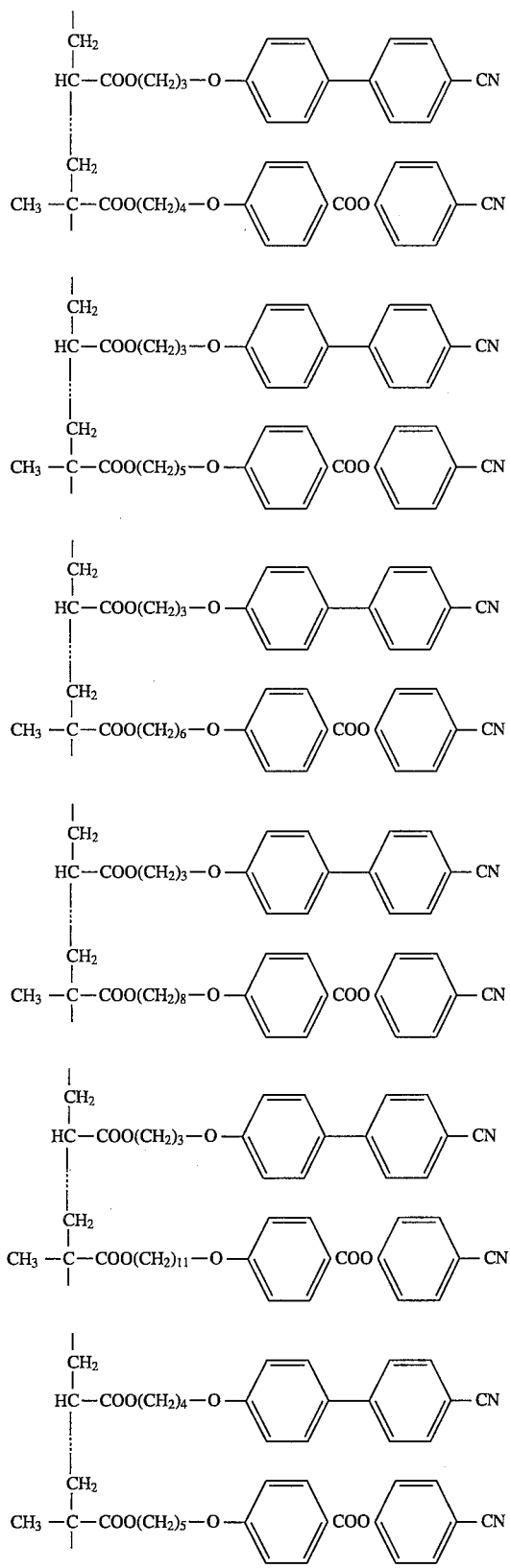

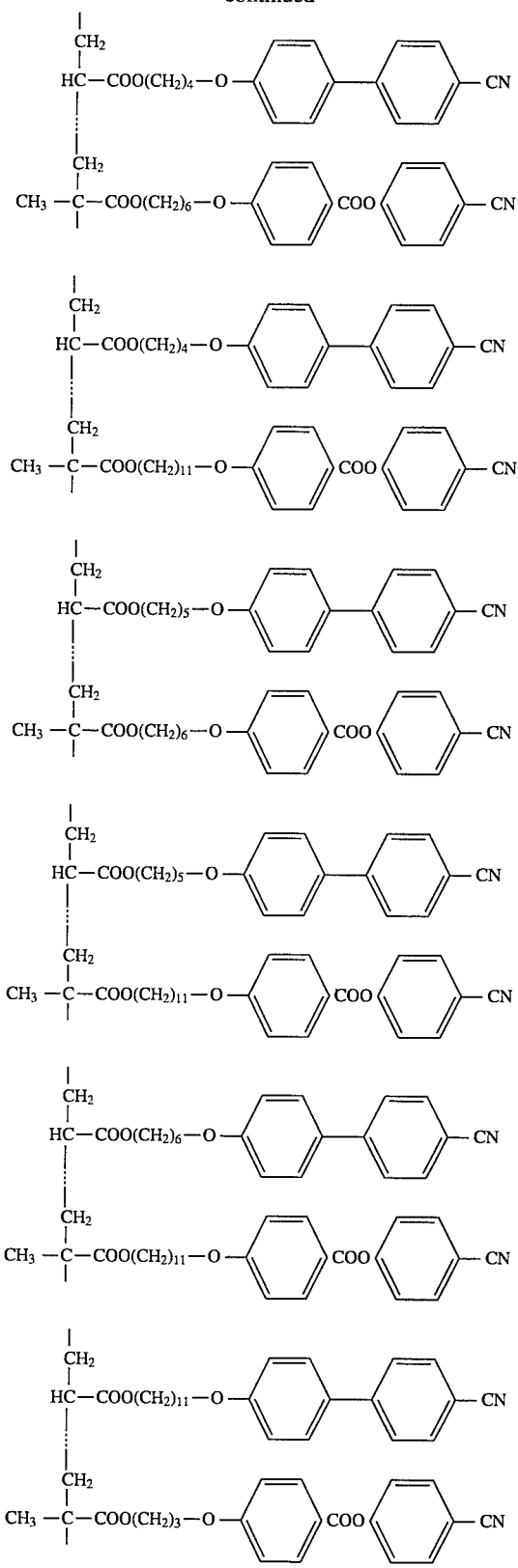
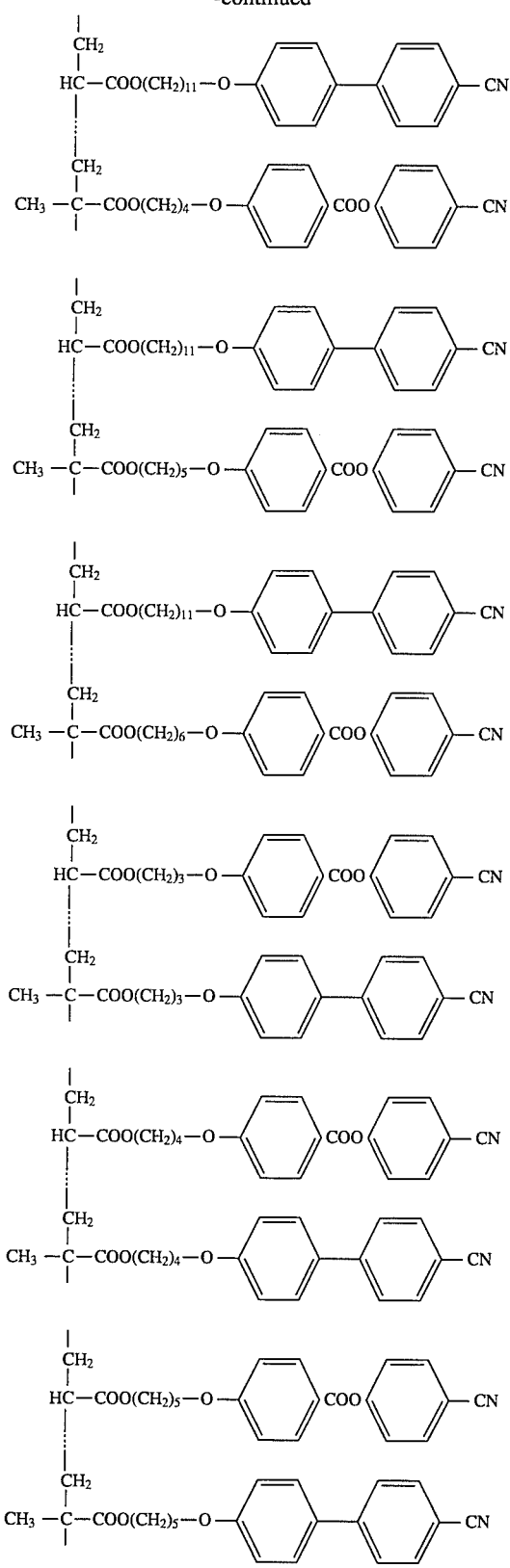

25
-continued
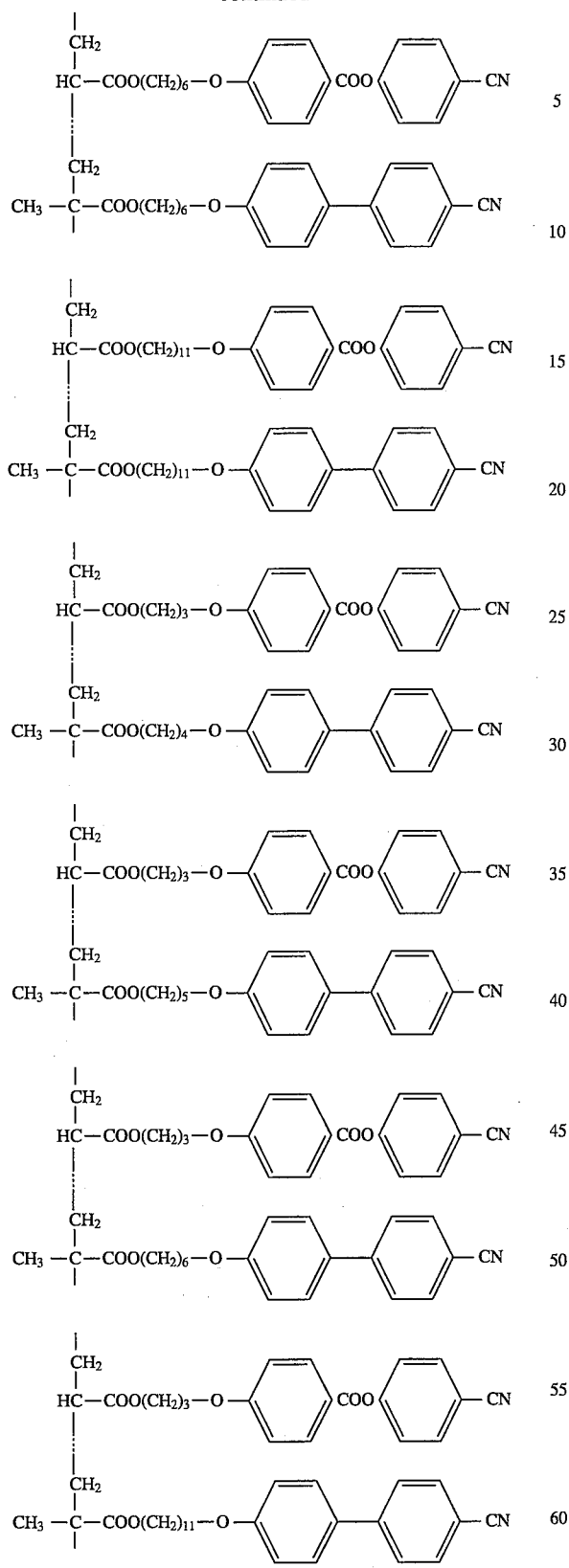
26
-continued
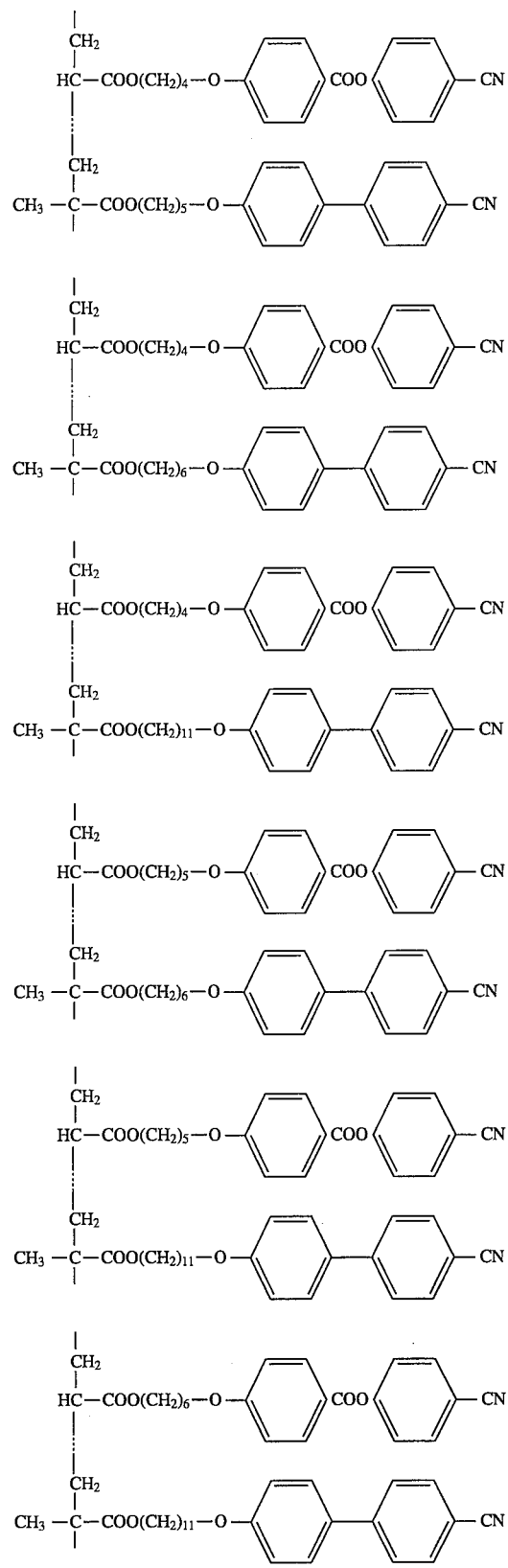

-continued

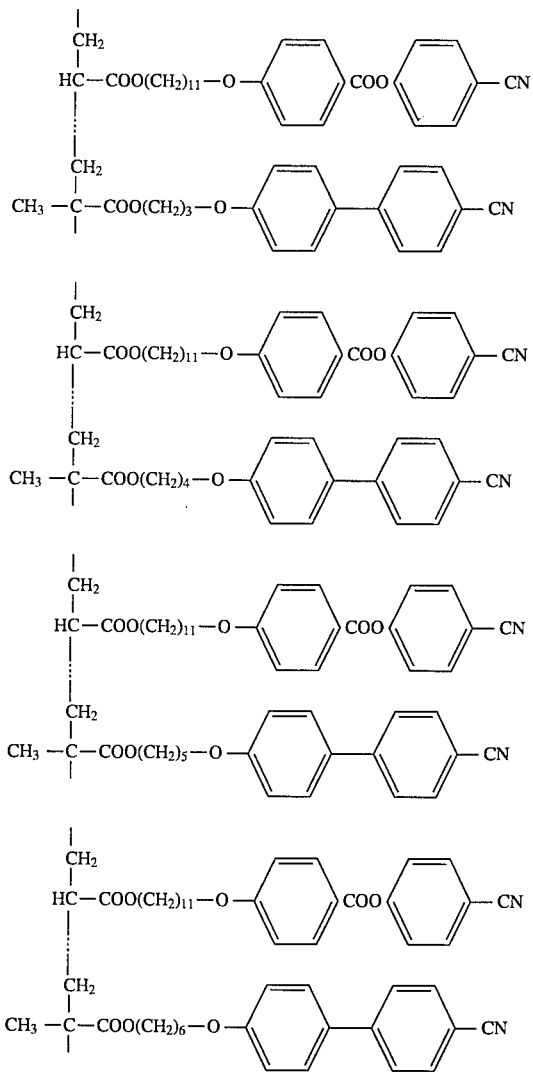

A synthesis example of the copolymer of the present invention is illustrated below.

The mixture of a liquid crystal monomer (4.5 g) represented by the following formula (a):

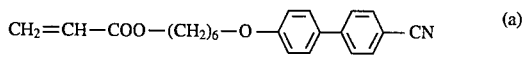

and methyl acrylate (0.5 g) was dissolved in tetrahydrofuran (THF) (8 ml) as a solvent. To the solution was added azobisisobutyronitrile (AIBN) (10 mg) as a polymerization initiator, and the mixture was allowed to polymerize in a nitrogen atmosphere at 60° C. for 48 hours. After completion of the polymerization, the reaction product was re-precipitated in large amount of ethylalcohol and hexane, and was further dried under a reduced pressure to recover 4.8 g of the liquid crystal copolymer.

Being analyzed by NMR, the composition of the obtained copolymer was found to be the same as the charged composition. The weight-average molecular weight was found to be 35000 as polystyrene reduction by GPC analysis.

Observation under a polarizing microscope with a temperature control apparatus and DSC analysis revealed that the resulting liquid crystal polymer had a glass transition point of 34° C. and a phase transition point, in which a polymer changes from liquid crystal phase to isotropic phase, of 89° C.

If desired, the liquid crystal polymer layer of the display medium may further contain other components in addition to copolymer (A) or (B). For example, it may contain various antioxidants, such as hindered amine or hindered phenol, for the purpose of improving weather resistance. Various dichroic dyes, such as anthraquinone dyes, styryl dyes, azomethine dyes, and azo dyes, may be added for the purpose of improving display contrast. Further, in order to efficiently conduct thermal recording with a laser beam, it is recommended to add various laser light absorbing dyes. In using a common semiconductor laser having a wavelength of 780 to 830 nm, near infrared absorbing dyes, such as phthalocyanine dyes, squarylium dyes, and azulenium dyes, may be used.

These additive components are added preferably in a total amount of from 0.01 to 5% by weight based on the total liquid crystal composition. Apart from these additives, low-molecular liquid crystals may be added in an amount of from 1 to 20% by weight for the purpose of improving display characteristics.

The erasable display medium according to the present invention may have various structures as shown in FIGS. 1 through 6 in accordance with the proposed writing and erasion system. In these Figures, numerals 1 to 9 indicate the following elements.

Figure 2:
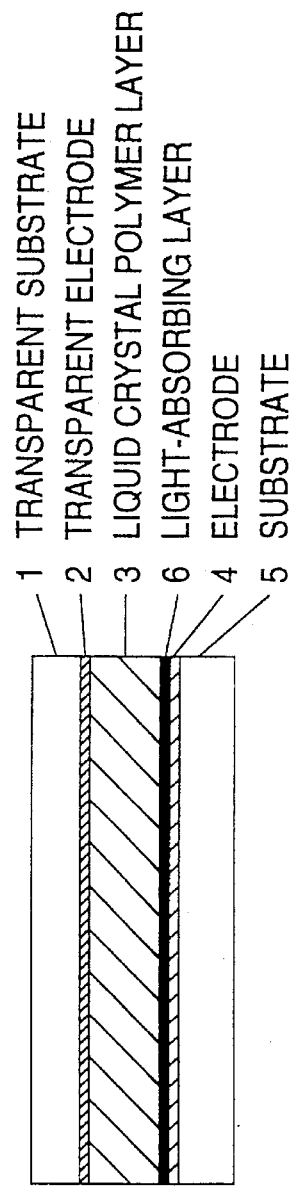
Figure 3:
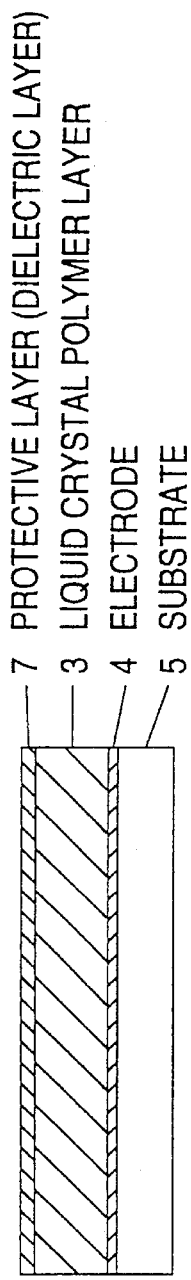
Figure 4:
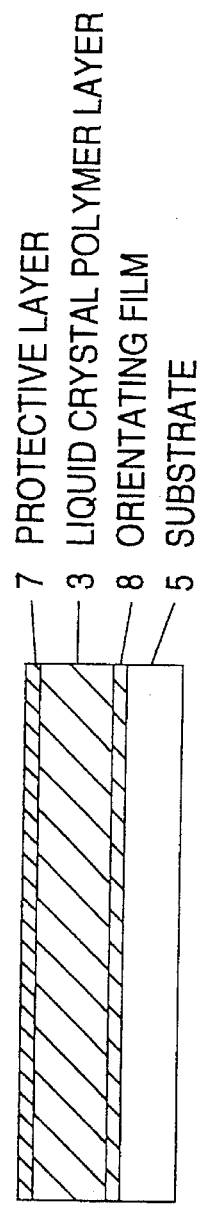
Figure 5:
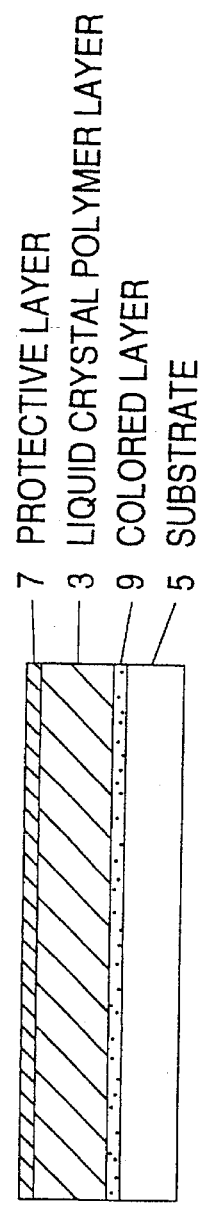
Figure 6:
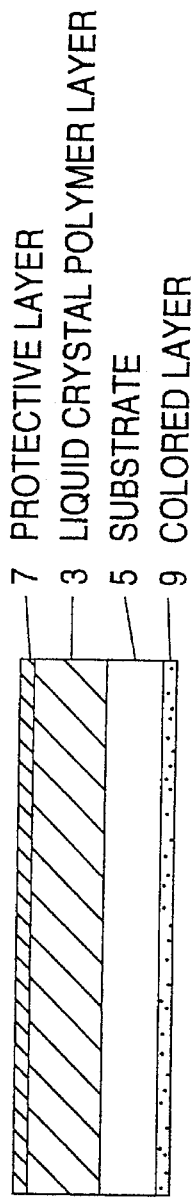

1 ... transparent substrate
2 ... transparent electrode
3 ... liquid crystal polymer layer
4 ... electrode
5 ... substrate
6 ... light-absorbing layer
7 ... protective layer (dielectric layer)
8 ... orientating film
9 ... colored layer The structures of FIGS. 1 and 2 are applicable to an electrical field initialization system. The structure of FIG. 3 is applicable to a static electrification initialization system. The structure of FIG. 4 is applicable to a thermal orientation initialization system. The structures of FIGS. 5 and 6 are applicable to a thermally controlled recording/erasing system. These layer structures will be explained for each system to which they are applied.

(1) Electrical Field Initialization System:

A display medium applied to this system has a laminate structure comprising a pair of substrates each having an electrode, the substrate and electrode on at least one side being transparent, and a liquid crystal polymer layer supported therebetween so that an electrical field may be applied to at least the liquid crystal polymer layer. FIG. 1 is a schematic cross section of a typical medium for this system, in which liquid crystal polymer layer 3 is sandwiched in between transparent substrate 1 having transparent electrode 2 and substrate 5 having electrode 4. Substrate 5 and electrode 4 may be either transparent or opaque.

A transparent substrate with a transparent electrode includes a glass plate having thereon an indium-tin oxide (ITO) deposit film or a tin oxide deposit film (so-called transparent conductive glass) and a conductive polyethylene terephthalate (PET) film having an ITO film. An opaque substrate with an opaque electrode includes an aluminum deposit film, a gold deposit film, a silver deposit film, and an aluminum plate.

Where the upper and lower electrodes and substrates are all transparent, for example, in the case of using a conductive PET film, the medium can be used as a projector display medium, such as an OHP sheet. Where a metallic film, such as an aluminum deposit film is used as one electrode substrate, the aluminum layer also serves as a light-reflecting layer so that the medium can be used as a display medium of reflection type. In this case, satisfactory display with high contrast can be obtained.

Where two transparent electrodes and two transparent substrates are transparent, an independent light-reflecting layer may be separately provided to obtain improved contrast. Further, a colored layer may be provided on the back of the display medium to obtain improved display contrast. This being the case, a display of white turbid state can be seen on a colored background. Where a dichroic dye is added to the liquid crystal polymer, multi-color display could be obtained.

In cases where recording is conducted by using a laser, a light-absorbing dye may be added to the liquid crystal layer, or light-absorbing layer 6 typically comprising CdTe may be separately provided.

Examples of light-absorbing layer include: an organic type thin layer comprising CdTe, CdS, Cr, Te, Ta, Se, Ti, W, Ni—Cr or a—Si:H; and an inorganic type thin layer comprising phthalocyanine dyes, cyanine dyes, merocyanine dyes, quinone dyes, azulenium dyes, azo dyes, pyridinium dyes, squarylium dyes, and pyrene dyes.

If desired, an additional layer for improving surface properties or adhesion may be provided between the electrode layer and the liquid crystal polymer layer. It is also possible to use spacers made of resins or glass in order to make the cell thickness uniform.

Initialization of the mediumcan be effected by heating the liquid crystal with an electrical field applied to orientate the liquid crystal molecules to the direction of the electrical field and then cooling the medium while keeping the liquid crystal molecules orientated to achieve a transparent state.

Recording on the medium can be carried out by imagewise heating the liquid crystal layer to a temperature above the phase transition point followed by cooling to thereby change the initial transparent state to a light-scattered (white turbid) state. In this case, a white turbid display can be made on a transparent background. Heating can be effected by means of a thermal head, a laser beam, etc.

Erasing of the recorded information can be carried out in the same manner as for the initialization. It is also possible to partially erase the recorded information by partially heating the liquid crystal layer with an electrical field applied.

Recording and erasing of information can be repeated many times by repeating the above-mentioned operations.

Inversely, the light-scattered white turbid state may be taken as an initial state. In this case, recording can be carried out by applying an electrical field while partially heating the liquid crystal layer to thereby make the heated area transparent to obtain a positive display of transparent image on a white turbid background. The contrast would be increased by providing a colored layer as a background to make the transparent image area colored.

(2) Static Electrification Initialization System:

A medium applied to this system has a simple layer structure containing only one electrode layer as typically shown in FIG. 3. The structure basically comprises substrate 5 with electrode 4 having laminated thereon liquid crystal polymer layer 3. If desired, the medium may further contain protective layer 7 (preferably a layer also functioning as a dielectric layer) for the purpose of improving surface strength, heat resistance, and chargeability. The materials for the substrate and the electrode can be selected from those described in (1) above. A light-reflecting layer, a light-absorbing layer, and a colored layer may also be provided similarly to system (1).

Unlike the system (1), initialization of the medium of this type is carried out by utilizing static electrification. Static electrification can be conducted with a general corona discharge. The medium as heated is subjected to a corona discharge to be charged uniformly thereby causing the liquid crystal molecules to be orientated by the internal electrical field. The electrode side is generally a ground. The charge polarity may be either positive or negative.

Recording on the medium is carried out in the same manner as in the system (1), and erasing of the recorded information can be conducted by the above-mentioned initialization.

(3) Thermal Orientation Initialization System:

This is a simple system in which initialization is performed only by a heat treatment without using an electrical field. A medium applied to this system has a basic structure comprising substrate 5, orientating film 8, and liquid crystal polymer layer 3 in this order as shown in FIG. 4. If desired, protective layer 7 may be provided for improving surface strength or heat resistance. Similarly to systems (1) and (2), a light-reflecting layer, a light-absorbing layer, or a colored layer may also be provided. Another orientating film may be formed between the protective layer and the liquid crystal polymer layer. In addition, a layer for improving adhesion, etc. may be formed between the transparent substrate and the orientating film.

Suitable orientating films include those for homogeneous orientation, such as a rubbed film of polyvinyl alcohol, polyimide, a nylon-epoxy-organotitanium system, and $SiO_2$; and those for homeotropic orientation, such as lecithin, organosilanes, and hexadecylamine. Since a stretched polymer film acts as a satisfactory film for homogeneous orientation, the orientating film may be omitted by using a stretched PET film as a substrate.

Initialization can be carried out by subjecting the display medium to annealing in a temperature range for a liquid crystal phase, and preferably at a temperature underneath the phase transition point, to make the liquid crystal polymer layer transparent. Optical transparency may be obtained either with homogeneous or homeotropic orientation, but transparency of a liquid crystal layer containing a dichroic dye is obtained only with homeotropic orientation.

Recording can be carried out in the same manner as in system (1). Erasing is effected by repeating the initialization.

(4) Thermally Controlled Recording/Erasing System:

While this system resembles system (3) in that recording and erasing are conducted through heat control, it is the simplest system, requiring no orientation of the liquid crystal molecules. The typical layer structures applied are basically composed of substrate 5 having laminated thereon liquid crystal polymer layer 3 as shown in FIGS. 5 and 6. If desired, protective layer 7 for improving surface strength or heat resistance may be provided. Similarly to systems (1) and (2), a light-reflecting layer, a light-absorbing layer, or a colored layer may also be provided.

The liquid crystal polymer layer after being coated assumes a light-scattered state (white turbid) due to finely dispersed liquid crystal domains. When the medium is imagewise heated by means of a thermal head or a laser beam to become isotropic and then rapidly quenched, the heated part is fixed in the isotropic state to constitute a transparent recorded part. While the heating means #or recording is basically the same as in systems (1) to (3), the rate of cooling should be higher than in systems (1) to (3). In using a thermal head as a heating means, erasing can be conducted by giving the thermal head lower energy than used for recording at a long pulse width. The recording/erasing means is not limited to a thermal head.

In the erasable display media according to systems (1) to (4), the thickness of the liquid crystal polymer layer is not particularly limited and subject to wide variation depending on the desired contrast. It is preferably selected from the range of from 1 to 100 μm, and particularly of from 5 to 50 μm.

The protective layer (dielectric layer) which may be provided on the liquid crystal polymer layer preferably has high heat resistance. Various thermosetting resins, such as fluorine resins and silicone resins, can be used. A plurality of protective layers may be provided. The protective layer preferably has a thickness of from 0.1 to 20 μm.

The orientating film usually has a thickness of from 0.001 to 5 μm. The material and thickness of the substrate are not particularly limited. A film as a substrate usually has a thickness of from 1 to 1000 μm. The substrate of projector display media which make a display with transmitted light, such as an OHP sheet, is preferably optically transparent.

As stated above, a reflecting layer or a colored layer may be provided as an independent constituent layer for improving contrast. Usable reflecting layers include the aforementioned metallic films. Usable colored layers include polymer films containing a dye or a pigment. These layers preferably have a thickness of from 0.1 to 100 μm.

EXAMPLES

The present invention is now illustrated in greater detail with reference to Examples, but it should be understood that the present invention is not construed as being limited thereto. All the percents and parts are by weight unless otherwise indicated.

The display contrast of the medium prepared was determined according to the following method.
1) Transmitted Light Contrast:
Parallel rays of halogen light were transmitted vertically through a sample having a transparent part and an opaque part. The light transmitted through each of the transparent part and the opaque part was condensed through a lens to a maximum opening angle of about ±10° and converted to an electrical current by means of a photodiode to measure the light intensity. The contrast was calculated as a ratio of (transmitted light intensity of the transparent part)/(transmitted light intensity of the opaque part).
2) Reflected Light Contrast:
The intensity of reflected light (λ=500 nm) each on a transparent part and an opaque part of a sample in which a black background sheet is attached to the back surface of the display medium was measured with a spectrophotometer "U-4000" (manufactured by Hitachi, Ltd.). The contrast was calculated as a ratio of (reflected light intensity of the opaque part)/(reflected light intensity of the transparent part).

Example 1

A 30% trichloroethane solution of a liquid crystal polymer represented by formula (1) shown below (weight-average molecular weight: 35000 (measured by GPC on polystyrene reduction); glass transition temperature (hereinafter abbreviated as Tg): 34° C.; phase transition point: 89° C.) was coated on a 100 μm thick stretched PET film by a blade coater and dried to form a liquid Crystal polymer layer having a thickness of about 20 μm. A butyl alcohol solution of a melamine type thermosetting resin "U-van" (produced by Mitsui Toatsu Chemicals Inc.) was coated thereon and cured at 130° C. for 1 hour to form a protective layer having a thickness of about 3 μm.

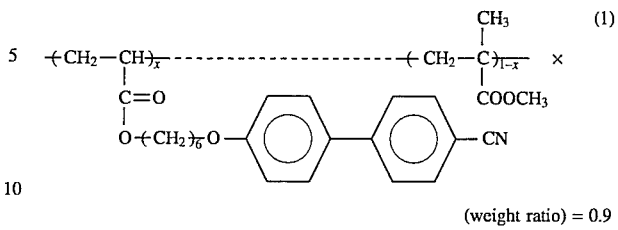

(weight ratio) = 0.9

The thus obtained erasable display medium was subjected to annealing for initialization at 85° C. for 10 minutes to be made transparent. Writing on the transparent medium was conducted with a thermal head (about 200 dpi) to obtain white letters on the transparent background. The transmitted light contrast measured with halogen light was found to be about 40. The recorded letters could be erased by repeating the initialization. Even after repetition of writing and erasing 100 times, the contrast was equal to the initial value, and no deterioration of display characteristics was observed.

Example 2

Aluminum was vacuum deposited on a 100 μm thick stretched PET film to form a reflecting layer. On the opposite side of the PET film were formed an about 20 μm thick liquid crystal polymer layer and a protective layer in the same manner as in Example 1 to obtain an erasable display medium. Writing on the resulting medium was conducted in the same manner as in Example 1. The reflected light contrast of the written area was about 60, which was higher than the contrast obtained in Example 1. The increase in contrast is considered attributed to an improvement in light scattering properties of the written area (light-scattered area) resulting from the formation of a reflecting layer. It seems that the incident light which should have been scattered in the written area was reflected on the reflecting layer and then scattered, resulting in an increase of the scattering efficiency.

Example 3

A 30% trichloroethane solution of 100 parts of a liquid crystal polymer represented by formula (2) shown below (weight-average molecular weight: 29000 (measured by GPC on polystyrene reduction); Tg: 34° C.; phase transition point: 110° C.) and 0.8 part of a dichroic dye "D5" (produced by BDH) was coated on a transparent conductive PET film "T-coat" (produced by Teijin Limited) and cured in the same manner as in Example 1 to form a liquid crystal polymer layer having a thickness of about 20 μm. Another transparent conductive PET film was superposed thereon, and the three layers were contact bonded under reduced pressure while heating at 110° C. to prepare an erasable display medium.

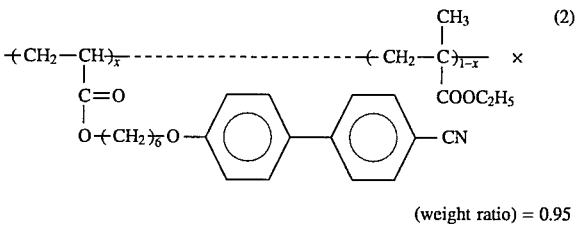

(weight ratio) = 0.95

The resulting medium was initialized (made transparent) by heating up to 110° C. with an alternating voltage of 40 V applied followed by cooling to room temperature. Writing on the initialized medium was conducted by using a 10 mW argon laser. As a result, a blue image was formed with a resolving power of about 10 μm line width. The transmitted light contrast of the display was about 100. Erasing of the display could be carried out either by heating the whole medium with a voltage applied or by irradiation of a laser beam with a voltage applied.

Example 4

An about 20 μm thick liquid crystal polymer layer comprising the liquid crystal polymer of formula (2) was formed on the same transparent conductive PET film "T-coat" in the same manner as in Example 3. Further, an about 3 μm thick melamine type thermosetting resin layer was formed thereon, serving as a protective layer and as a dielectric layer to prepare an erasable display medium.

The resulting medium was initialized (made transparent) by heating to 110° C. on a hot plate, charging by a corona discharge with its electrode as a ground, and cooling to room temperature. Writing on the thus initialized medium was carried out in the same manner as in Example 1 to obtain a display having a transmitted light contrast of about 50. Erasing of the display could be conducted by corona charging under heating. The writing and erasing could be repeatedly performed.

Example 5

A 30% trichloroethane solution of a liquid crystal polymer represented by formula (3) shown below (weight-average molecular weight: 33000 (GPC, polystyrene reduction); Tg: 34° C.; phase transition point: 113° C.) was coated on a 100 μm thick PET film by a blade coater and dried to form a liquid crystal polymer layer having a thickness of about 20 μm. A butyl alcohol solution of a melamine type thermosetting resin "U-Van" was coated thereon and cured at 130° C. for 1 hour to form a cured layer having a thickness of about 0.5 μm. Then, a methyl ethyl ketone solution of a silicone polymer "Symac US-350" (produced by Toa Gosei Chemical Industry Co., Ltd.) was coated and dried at 100° C. for 1 hour to form a heat-resistant layer having a thickness of about 2 μm. The cured layer and the heat-resistant layer functioned in protection.

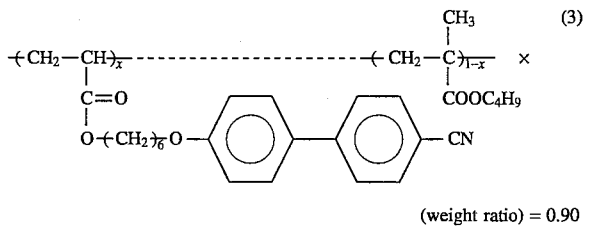

(3)

(weight ratio) = 0.90

The thus obtained erasable display medium was initialized (made white turbid) by heating in an oven at 120° C. followed by cooling. On writing with a thermal head "Rupo" (a word processor manufactured by Toshiba), a transparent image was formed. When the medium was put on a black sheet, a clear black display was obtained on a white turbid background. The reflected light contrast was about 40. Erasing of the display could be carried out either by again heating the medium to 120° C. followed by cooling or by passing the medium through heated rolls. Even after repeating the writing and erasing 100 times, the contrast was equal to the initial level, and no deterioration in display characteristics was observed.

Example 6

A toluene solution of polymethyl methacrylate having dispersed therein carbon black particles was coated on a 100 μm thick PET film and dried to form a black colored layer having a thickness of about 5 μm. On the opposite side of the PET film were successively formed a liquid crystal polymer layer comprising the compound of formula (3) and a protective layer in the same manner as in Example 5 to prepare an erasable display medium. Writing on the resulting medium was conducted in the same manner as in Example 5 to obtain black letters on a white turbid background. Erasing of the display was also effected in the same manner as in Example 5.

Example 7

A 40% toluene solution of a liquid crystal polymer represented by formula (4) shown below (weight average molecular weight: 20000 (GPC, polystyrene reduction); Tg: 40° C.; phase transition point: 109° C.) was coated on a transparent conductive PET film "T-coat" by means of a blade coater and dried to form a liquid crystal polymer layer having a thickness of about 30 μm. After spreading a resin-made spacer having a diameter of 30 μm, another transparent conductive PET film was superposed thereon, and the three layers were contact bonded under reduced pressure while heating at 110° C. to prepare an erasable display sheet.

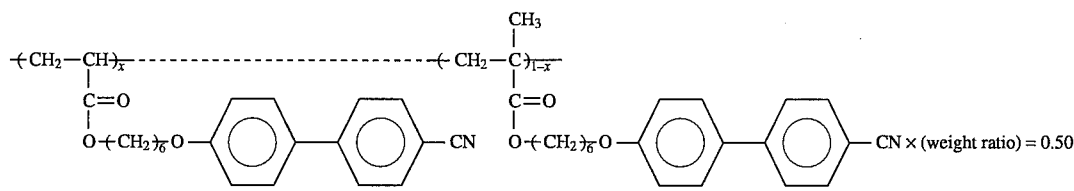

(4)

The medium as prepared assumed white turbidity. Initialization for making the medium transparent was carried out by heating at 110° C. and then cooling to room temperature while applying an alternating voltage of 30 V/50 Hz. The transparent medium had a halogen light transmission of 86%.

Writing on the thus initialized medium was conducted with a thermal head (about 200 dpi) to obtain white turbid letters on a transparent background. The transmitted light contrast was found to be about 40. When the letters of the medium was projected by means of an OHP, the written area was displayed as clear black letters. The display could be erased by repeating the initialization. Even after repeating writing and erasing 100 times, the contrast was equal to the initial value, and no deterioration in display characteristics was observed.

A synthesis example of the liquid crystal polymer of formula (4) used above is illustrated below.
Synthesis of Liquid Crystal Polymer (Copolymer):

Liquid crystal monomers represented by formulae (A) and (B) shown below each weighing 2.0 g were dissolved in 20 ml of tetrahydrofuran (THF). To the solution was added 0.01 g of azoisobutyronitrile (AIBN), and the mixture was allowed to polymerize in a nitrogen atmosphere at 60° C. for 48 hours. After completion of the polymerization, the reaction product was re-precipitated in ethanol as a poor solvent and dried to recover 3.7 g of the copolymer produced as a white solid. Observation under a polarizing microscope and thermal analysis revealed that the resulting liquid crystal polymer had a temperature range for liquid crystal properties of from 40° to 109° C.

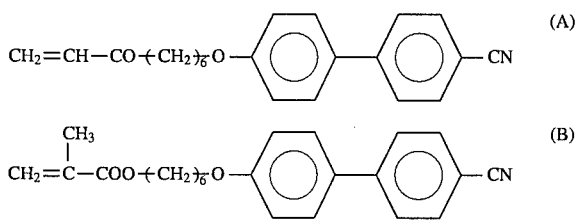

Example 8

A liquid crystal polymer layer comprising the copolymer of formula (4) and having a thickness of about 30 μm was formed on a 100 μm thick stretched PET film in the same manner as in Example 7, and a protective layer was further formed thereon in the same manner as in Example 5 to prepare an erasable display medium.

The resulting medium was subjected to annealing for initialization at 105° C. for 10 minutes to be made transparent. Writing on the transparent medium was conducted with a thermal head (about 200 dpi) to obtain white letters on the transparent background. The transmitted light contrast was found to be about 40. The recorded letters could be erased by repeating the initialization. Even after repetition of writing and erasing 100 times, the contrast was equal to the initial value, and no deterioration of display characteristics was observed.

Example 9

A black colored layer was formed on a 100 μm thick PET film in the same manner as in Example 6. On the opposite side of the PET film were successively laminated an about 30 μm thick liquid crystal polymer layer comprising the copolymer of formula (4) and a protective layer in the same manner as in Example 8 to prepare an erasable display medium.

The resulting medium was initialized (made white turbid) by heating in an oven at 120° C. followed by cooling. On writing with a thermal head "Rupo", a clear black display was obtained on a white turbid background. The reflected light contrast was about 40. Erasing of the display could be carried out either by again heating the medium to 120° C. followed by cooling or by passing the medium through heated rolls. Even after repeating the writing and erasing 100 times, the contrast was equal to the initial level, and no deterioration in display characteristics was observed.

Example 10

On a 50 μm thick PET film was coated a 5% methanol solution of octadecyldimethyl[3-(trimethoxysilyl)propyl] ammonium chloride (a product of Chisso Corporation) as a homeotropic orientating agent by means of a blade coater and dried to form a homeotropic orientating film having a thickness of about 0.5 μm. A liquid crystal polymer layer comprising the compound of formula (1) and having a thickness of about 30 μm was then formed thereon in the same manner as in Example 2 to prepare an erasable display medium in a white turbid state.

The resulting medium was initialized by heating at 105° to 110° C. for 20 minutes to turn transparent. The transparent medium had a halogen light transmission of 70%.

White turbid letters were displayed on the transparent background by writing with a thermal head in the same manner as in Example 8. When this medium was projected by means of an OHP, the written area was clearly displayed as black letters. Erasion of the display could be carried out by re-heating at 105° to 110° C. for 20 minutes. The writing and erasing could thus be repeated.

TEST EXAMPLE

Evaluation of Contrast and Heat Stability

A THF solution containing each of the liquid crystal polymer represented by formula (4), a liquid crystal polymer comprising a repeating unit represented by formula (5) shown below, and a liquid crystal polymer comprising a repeating unit represented by formula (6) shown below was coated on an ITO glass plate (25×30 mm) and dried to form a liquid crystal polymer layer. After spreading a glass spacer having a diameter of 30 μm, another ITO glass plate was contact bonded thereon under heating to prepare a test sample for evaluation.

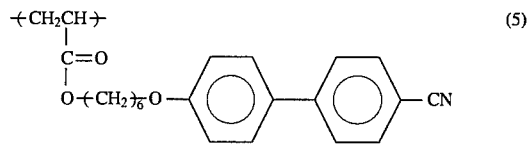

(weight-average molecular weight: 28000 (GPC, polystyrene reduction); Tg: 35° C.; phase transition point: 122° C.)

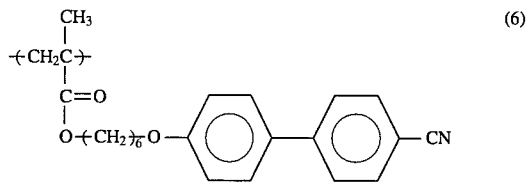

(weight-average molecular weight: 25000 (GPC, polystyrene reduction); Tg: 46° C.; phase transition point: 106° C.)

The samples as prepared assumed white turbidity. Each of the samples was heated and then cooled while applying an alternating voltage of 40 V for initialization to be made transparent. The thus initialized sample was heated in spots by means of a hot air heating apparatus and then cooled to form white turbid spots, and the transmitted light contrast was determined. Separately, each of the samples was preserved at 60° C. for 1 hour, and the same evaluation as described above was made. The results obtained are shown in Table 1 below.

TABLE 1

| Liquid crystal Polymer | Transmitted Light Contrast | |
|---|---|---|
| | Initial Stage | After Preservation (60° C. × 1 hr) |
| Formula (4) | 37 | 37 |
| Formula (5) | 28 | 4 |
| Formula (6) | 6 | 6 |

The results of the contrast (initial stage) reveal that the liquid crystal polymer of formula (4) is the best and that of formula (5) is the next. When each of these two samples having white turbid spots was projected by means of an OHP, the spots were clearly seen as a black display.

On the other hand, the sample using the polymer of formula (6) showed a low contrast, and the spots, when projected by an OHP, were displayed as yellow shade of poor perceptibility. The failure may be ascribed to a small diameter of the liquid crystal domains in the written area, which allows longer wavelength light to pass therethrough.

It is also seen that the liquid crystal polymers of formulae (4) and (6) exhibited high heat stability with no change of display contrast after preservation under heat, whereas the sample using the liquid crystal polymer of formula (5) underwent considerable reduction in contrast when preserved under heat, namely, had poor heat stability.

From all these results, it is apparent that the display medium using the liquid crystal polymer of formula (4) as used in Example 7 is superior in both contrast and heat stability.

As described and demonstrated above, the erasable display medium according to the present invention using a liquid crystal copolymer having a specific structure as a recording layer is excellent in stability in repeated use, preservation stability of the record, display contrast, and processability. It is capable of repetition of writing and erasing, i.e., light transmission and light scattering by the action of heat, an electrical field, or a magnetic field. It is thin and offers a reflection type display good to eyes just like paper. This fact makes the medium of the invention beneficial from the standpoint of saving resources. Further, since the medium may have a wide area without any restriction, it is applicable as a sheet for a wide area display device like a white board. Furthermore, the medium achieves a high light transmission contrast and is therefore useful as a projector display medium, such as an OHP sheet.

While the invention has been described in detail and with reference to specific examples thereof, it will be apparent to one skilled in the art that various changes and modifications can be made therein without departing from the spirit and scope thereof.

What is claimed is:

1. An erasable display medium comprising a substrate having thereon at least one liquid crystal polymer layer comprising a side chain liquid crystal polymer which repeatedly and reversibly switches from a transparent state and a light-scattered state by the action of at least one of heat, an electrical field, and a magnetic field, said side chain liquid crystal polymer being a block or graft copolymer comprising a repeating unit represented by formula (I):

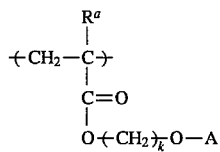
(I)

and a repeating unit represented by non-liquid crystal formula (II):

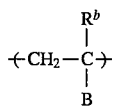
(II)

or a block or graft copolymer comprising a repeating unit represented by formula (III):

(III)

and a repeating unit represented by formula (IV):

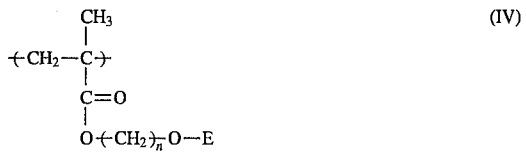
(IV)

wherein $R^a$ and $R^b$ each represent a hydrogen atom, a methyl group, or a halogen atom; A, D, and E each represent a liquid crystal molecule residue composed of one or more groups selected from:

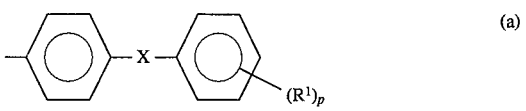
(a)

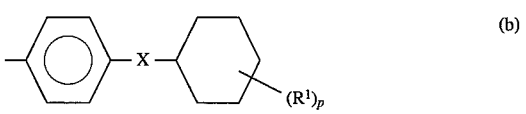
(b)

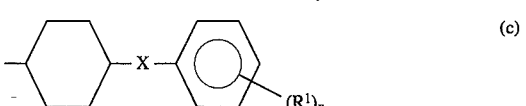
(c)

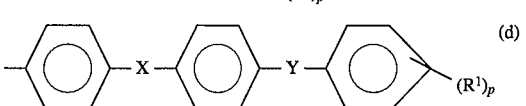
(d)

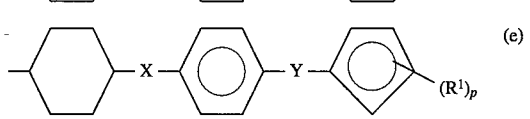
(e)

(f)

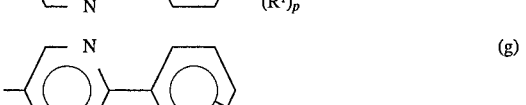
(g)

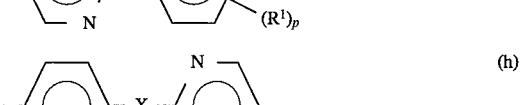
(h)

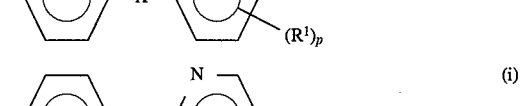
(i)

wherein X and Y each represent a single bond, —N=N—, —N(→O)=N—, —CH=N—, —N=CH—, —COO—, —O(C=O)—, or an ethynylene group; $R^1$ represents an alkoxy group, a halogen atom, a cyano group, a carboxyl group, or an alkyl group; and p represents an integer of from 1 to 5; when p is 2 or greater, the plural $R^1$ groups may be the same or different;

B represents a group composed of one or more of a hydroxyl group, a halogen atom, an alkyl group, an alkenyl group, a substituted or unsubstituted phenyl group, a heterocyclic group, an amino group, a cyano group, —COOR², —OCOR², and —CONR²R³, wherein R² and R³ each represent a hydrogen atom, an alkyl group having from 1 to 30 carbon atoms which may be substituted with a halogen atom or a heterocyclic group, an alkenyl group, an alicyclic group, a hydroxyalkyl group, a hetero atom-containing alkyl group, or a substituted or unsubstituted phenyl group; and k, m, and n each represent an integer of from 1 to 30 and wherein said copolymer has a weight average molecular weight between 1000 to 500,000; and said display medium further comprises an orientating film selected from the group consisting of rubbed film of polyvinyl alcohol, nylon-epoxy-organotitanium system, lecithin and hexadecylacylamine or a substrate film of stretched polyethylene terephthalate.

2. An erasable display medium as claimed in claim 1, wherein said medium further comprises a light-reflecting layer.

3. An erasable display medium as claimed in claim 1, wherein said medium further comprises a colored layer.

4. An erasable display medium as claimed in claim 1, wherein said copolymer comprises a repeating unit represented by formula (I) and a repeating unit represented by formula (II).

5. An erasable display sheet for a projector comprising a transparent substrate having thereon at least one liquid crystal polymer layer comprising a side chain liquid crystal polymer which repeatedly and reversibly switches from a transparent state and a light-scattered state by the action of at least one of heat, an electrical field, and a magnetic field, said side chain liquid crystal polymer being a block or graft copolymer comprising a repeating unit represented by formula (I):

$$\begin{array}{c} R^a \\ | \\ \text{(---CH}_2\text{---C---)} \\ | \\ C=O \\ | \\ O\text{(---CH}_2\text{)}_k O\text{---A} \end{array} \quad (I)$$

and a repeating unit represented by non-liquid crystal formula (II)

$$\begin{array}{c} R^b \\ | \\ \text{(---CH}_2\text{---C---)} \\ | \\ B \end{array} \quad (II)$$

wherein $R_a$ and $R_b$ each represent a hydrogen atom, a methyl group, or a halogen atom; A represents a liquid crystal molecule residue composed of one or more groups selected from:

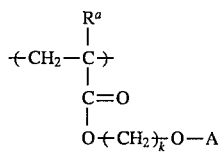 (a)

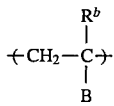 (b)

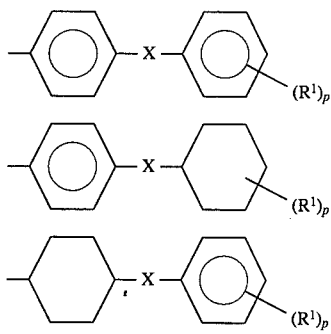 (c)

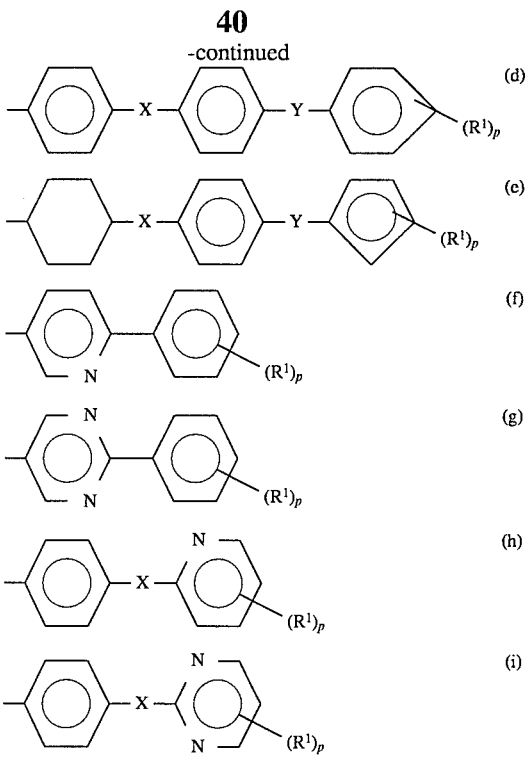

(d)
(e)
(f)
(g)
(h)
(i)

wherein X and Y each represent a single bond, —N=N—, —N(→O)N—, —CH=N—, —N=CH—, —COO—, —O(C=O)—, or an ethynylene group; $R^1$ represents an alkoxy group, a halogen atom, a cyano group, a carboxyl group, or an alkyl group; and p represents an integer of from 1 to 5; when p is 2 or greater, the plural $R^1$ groups may be the same or different; B represents a group composed of one or more of a hydroxyl group, a halogen atom, an alkyl group, an alkenyl group, a substituted to unsubstituted phenyl group, a heterocyclic group, an amino group, a cyano group, —COOR², —OCOR², and —CONR²R³, wherein R² and R³ each represent a hydrogen atom, an alkyl group having from 1 to 30 carbon atoms which may be substituted with a halogen atom or a heterocyclic group, an alkenyl group, an alicyclic group, a hydroxyalkyl group, a hetero atom-containing alkyl group, or a substituted or unsubstituted phenyl group; and k, m, and n each represent an integer of from 1 to 30 and wherein said copolymer has a weight average molecular weight between 1000 to 500,000; and said display medium further comprises an orientating film selected from the group consisting of rubbed film of polyvinyl alcohol, nylon-epoxy-organotitanium system, lecithin and hexadecylacylamine or a substrate film of stretched polyethylene terephthalate.

6. An erasable display medium comprising a substrate having thereon at least one liquid crystal polymer layer comprising a side chain liquid crystal polymer which repeatedly and reversibly switches from a transparent state and a light-scattered state by the action of at least one of heat, an electrical field, and a magnetic field, said side chain liquid crystal polymer being a block or graft copolymer consisting essentially of a repeating unit represented by formula (I):

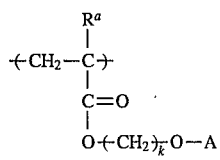 (I)

and a repeating unit represented by non-liquid crystal formula (II):

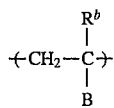 (II)

or a block or graft copolymer consisting essentially of a repeating unit represented by formula (III):

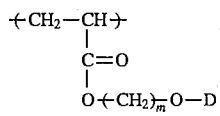 (III)

and a repeating unit represented by formula (IV):

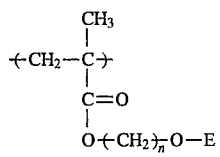 (IV)

wherein $R^a$ and $R^b$ each represent a hydrogen atom, a methyl group, or a halogen atom; A, D, and E each represent a liquid crystal-molecule residue composed of one or more groups selected from:

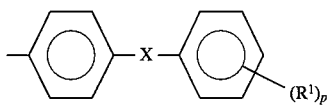 (a)

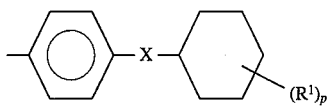 (b)

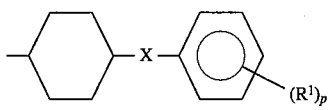 (c)

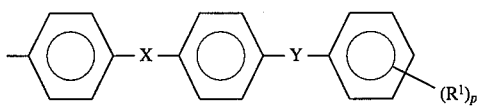 (d)

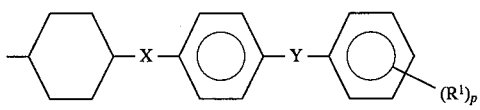 (e)

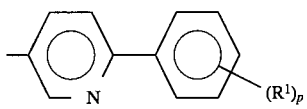 (f)

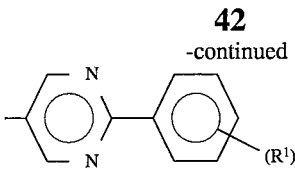 (g)

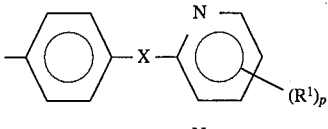 (h)

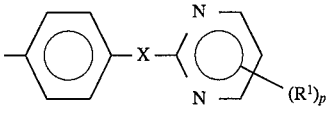 (i)

wherein X and Y each represent a single bond, —N═N—, —N(→O)═N—, —CH═N—, —N═CH—, —COO—, —O(C═O)—, or an ethynylene group; $R^1$ represents an alkoxy group, a halogen atom, a cyano group, a carboxyl group, or an alkyl group; and p represents an integer of from 1 to 5; when p is 2 or greater, the plural $R^1$ groups may be the same or different;

B represents a group composed of one or more of a hydroxyl group, a halogen atom, an alkyl group, an alkenyl group, a substituted or unsubstituted phenyl group, a heterocyclic group, an amino group, a cyano group, —$COOR^2$, —$OCOR^2$, and —$CONR^2R^3$, wherein $R^2$ and $R^3$ each represent a hydrogen atom, an alkyl group having from 1 to 30 carbon atoms which may be substituted with a halogen atom or a heterocyclic group, an alkenyl group, an alicyclic group, a hydroxyalkyl group, a hetero atom-containing alkyl group, or a substituted or unsubstituted phenyl group; and k, m, and n each represent an integer of from 1 to 30 and wherein said copolymer has a weight average molecular weight between 1000 to 500,000; and said display medium further comprises an orientating film selected from the group consisting of rubbed film of polyvinyl alcohol nylon-epoxy-organotitanium system, lecithin and hexadecylacylamine or a substrate film of stretched polyethylene terephthalate.

7. A method of reversibly switching the erasable display medium of claim 1 between a light scattered state and a transparent state comprising applying heat to at least a part of said at least one liquid crystal polymer layer.

8. A method of reversibly switching the erasable display medium of claim 5 between a light scattered state and a transparent state comprising applying heat to at least a part of said at least one liquid crystal polymer layer.

9. A method of reversibly switching the erasable display medium of claim 6 between a light scattered state and a transparent state comprising applying heat to at least a part of said at least one liquid crystal polymer layer.

* * * * *